(12) United States Patent
Obradovich

(10) Patent No.: US 7,171,291 B2
(45) Date of Patent: Jan. 30, 2007

(54) TECHNIQUE FOR SELECTING A SERVICE PROVIDER TO SERVICE A VEHICLE

(75) Inventor: Michael L. Obradovich, San Clemente, CA (US)

(73) Assignee: American Calcar Inc., Wilmington, DE (US)

( * ) Notice: Subject to any disclaimer, the term of this patent is extended or adjusted under 35 U.S.C. 154(b) by 486 days.

(21) Appl. No.: 10/038,346

(22) Filed: Jan. 2, 2002

(65) Prior Publication Data

US 2002/0065585 A1    May 30, 2002

Related U.S. Application Data

(60) Division of application No. 09/848,391, filed on May 3, 2001, now Pat. No. 6,577,928, which is a continuation of application No. 09/355,433, filed as application No. PCT/US98/01119 on Jan. 5, 1998, now Pat. No. 6,282,464, which is a continuation-in-part of application No. 08/789,934, filed on Jan. 28, 1997, now Pat. No. 6,009,355.

(51) Int. Cl.
*G06F 19/00* (2006.01)

(52) U.S. Cl. .......................... 701/29; 701/30; 701/200; 701/201; 340/988; 340/995.1; 340/995.24

(58) Field of Classification Search .................. 701/28, 701/30, 31, 39, 200, 201, 207, 208, 209; 340/988, 995.1, 995.24
See application file for complete search history.

(56) References Cited

U.S. PATENT DOCUMENTS 3,582,926 A    6/1971    Hassan

| 4,314,232 A | 2/1982  | Tsunoda    |
|-------------|---------|------------|
| 4,401,848 A | 8/1983  | Tsunoda    |
| 4,407,564 A | 10/1983 | Ellis      |
| 4,419,730 A | 12/1983 | Ito et al. |
| 4,536,739 A | 8/1985  | Nobuta     |
| 4,582,389 A | 4/1986  | Wood et al.|

(Continued)

FOREIGN PATENT DOCUMENTS

DE    4431070    3/1996

(Continued)

OTHER PUBLICATIONS

"OnStar" brochure by General Motors Corp., 1997.

(Continued)

*Primary Examiner*—Thomas G. Black
*Assistant Examiner*—Eric M. Gibson
(74) *Attorney, Agent, or Firm*—Christie, Parker & Hale, LLP

(57) ABSTRACT

In a multimedia information and control system for use in an automobile, at least one interface is employed which enables a user to access information concerning the automobile and control vehicle functions in an efficient manner. The user may select one of a plurality of displayed options on a screen of such an interface. Through audio, video and/or text media, the user is provided with information concerning the selected option and the vehicle function corresponding thereto. Having been so informed, the user may activate the selected option to control the corresponding vehicle function.

23 Claims, 17 Drawing Sheets

U.S. PATENT DOCUMENTS

| | | | |
|---|---|---|---|
| 4,636,782 A | 1/1987 | Nakamura et al. | |
| 4,731,769 A | 3/1988 | Schaefer et al. | |
| 4,740,779 A | 4/1988 | Cleary et al. | |
| 4,740,780 A | 4/1988 | Brown et al. | |
| 4,752,824 A | 6/1988 | Moore | |
| 4,795,223 A | 1/1989 | Moss | |
| 4,818,048 A | 4/1989 | Moss | |
| 4,827,520 A | 5/1989 | Zeinstra | |
| 4,837,551 A | 6/1989 | Iino | |
| 4,876,594 A | 10/1989 | Schiffman | |
| 4,914,705 A | 4/1990 | Nigawara | |
| 4,988,976 A | 1/1991 | Lu | |
| 4,995,258 A | 2/1991 | Frank | |
| 4,996,959 A | 3/1991 | Akimoto | |
| 5,006,829 A | 4/1991 | Miyamoto et al. | |
| 5,043,736 A | 8/1991 | Darnell et al. | |
| 5,051,735 A | 9/1991 | Furukawa | |
| 5,058,044 A | 10/1991 | Stewart et al. | |
| 5,070,323 A | 12/1991 | Iino et al. | |
| 5,119,504 A | 6/1992 | Durboraw, III | |
| 5,198,797 A | 3/1993 | Daidoji | |
| 5,214,413 A | 5/1993 | Okabayashi et al. | |
| 5,214,707 A | 5/1993 | Fujimoto et al. | |
| 5,235,633 A | 8/1993 | Dennison et al. | |
| 5,257,190 A | 10/1993 | Crane | |
| 5,274,560 A | 12/1993 | LaRue | |
| 5,278,532 A | 1/1994 | Hegg et al. | |
| 5,293,115 A | 3/1994 | Swanson | |
| 5,299,132 A | 3/1994 | Wortham | |
| 5,334,974 A | 8/1994 | Simms et al. | |
| 5,335,276 A | 8/1994 | Thompson et al. | |
| 5,335,743 A | 8/1994 | Gillbrand et al. | |
| 5,345,817 A | 9/1994 | Grenn et al. | |
| 5,351,041 A | 9/1994 | Ikata et al. | |
| 5,361,165 A | 11/1994 | Stringfellow et al. | |
| 5,371,510 A | 12/1994 | Miyauchi et al. | |
| 5,400,018 A | 3/1995 | Scholl et al. | |
| 5,400,045 A | 3/1995 | Aoki | |
| 5,404,443 A | 4/1995 | Hirata | |
| 5,414,439 A | 5/1995 | Groves et al. | |
| 5,422,565 A | 6/1995 | Swanson | |
| 5,432,904 A | 7/1995 | Wong | |
| 5,440,428 A | 8/1995 | Hegg et al. | |
| 5,442,553 A | 8/1995 | Parillo | |
| 5,450,321 A | 9/1995 | Crane | |
| 5,450,329 A | 9/1995 | Tanner | |
| 5,450,613 A | 9/1995 | Takahara et al. | |
| 5,475,399 A | 12/1995 | Borsuk | |
| 5,479,482 A | 12/1995 | Grimes | |
| 5,483,632 A | 1/1996 | Kuwamoto et al. | |
| 5,486,840 A | 1/1996 | Borrego et al. | |
| 5,493,658 A | 2/1996 | Chiang et al. | |
| 5,497,271 A | 3/1996 | Mulvanny et al. | |
| 5,497,339 A | 3/1996 | Bernard | |
| 5,504,622 A | 4/1996 | Oikawa et al. | |
| 5,506,595 A | 4/1996 | Fukano et al. | |
| 5,511,724 A | 4/1996 | Freiberger et al. | |
| 5,519,403 A | 5/1996 | Bickley et al. | |
| 5,519,410 A | 5/1996 | Smalanskas et al. | |
| 5,523,559 A | 6/1996 | Swanson | |
| 5,525,977 A | 6/1996 | Suman | |
| 5,528,248 A | 6/1996 | Steiner et al. | |
| 5,528,496 A | 6/1996 | Brauer et al. | |
| 5,534,888 A | 7/1996 | Lebby et al. | |
| 5,539,869 A | 7/1996 | Spoto et al. | |
| 5,553,661 A | 9/1996 | Beyerlein et al. | |
| 5,555,172 A | 9/1996 | Potter | |
| 5,555,286 A | 9/1996 | Tendler | |
| 5,555,502 A | 9/1996 | Opel | |
| 5,559,520 A | 9/1996 | Barzegar et al. | |
| 5,561,704 A * | 10/1996 | Salimando | 342/457 |
| 5,572,204 A | 11/1996 | Timm et al. | |
| 5,576,724 A | 11/1996 | Fukatsu et al. | |
| 5,579,535 A | 11/1996 | Orlen et al. | |
| 5,627,547 A | 5/1997 | Ramaswamy et al. | |
| 5,638,305 A | 6/1997 | Kobayashi et al. | |
| 5,648,769 A | 7/1997 | Sato et al. | |
| 5,650,929 A | 7/1997 | Potter et al. | |
| 5,654,715 A | 8/1997 | Hayashikura et al. | |
| 5,666,102 A | 9/1997 | Lahiff | |
| 5,670,953 A | 9/1997 | Satoh et al. | |
| 5,686,910 A | 11/1997 | Timm et al. | |
| 5,687,215 A | 11/1997 | Timm et al. | |
| 5,689,252 A | 11/1997 | Ayanoglu et al. | |
| 5,691,695 A | 11/1997 | Lahiff | |
| 5,702,165 A | 12/1997 | Koibuchi | |
| 5,712,640 A | 1/1998 | Andou et al. | |
| 5,734,973 A | 3/1998 | Honda | |
| 5,752,754 A | 5/1998 | Amitani et al. | |
| 5,758,311 A | 5/1998 | Tsuji et al. | |
| 5,777,394 A | 7/1998 | Arold | |
| 5,790,973 A * | 8/1998 | Blaker et al. | 340/991 |
| 5,794,174 A * | 8/1998 | Janky et al. | 340/989 |
| 5,806,018 A | 9/1998 | Smith et al. | |
| 5,819,201 A * | 10/1998 | DeGraaf | 701/29 |
| 5,844,473 A | 12/1998 | Kaman | |
| 5,859,628 A * | 1/1999 | Ross et al. | 340/990 |
| 5,898,392 A * | 4/1999 | Bambini et al. | 340/996 |
| 5,917,405 A | 6/1999 | Joao | |
| 5,917,408 A | 6/1999 | Cardillo et al. | |
| 5,931,878 A | 8/1999 | Chapin, Jr. | |
| 5,963,861 A | 10/1999 | Hanson | |
| 5,987,394 A | 11/1999 | Takakura et al. | |
| 6,028,537 A * | 2/2000 | Suman et al. | 340/988 |
| 6,029,069 A | 2/2000 | Takaki | |
| 6,047,234 A | 4/2000 | Cherveny et al. | |
| 6,128,559 A | 10/2000 | Saitou et al. | |
| 6,141,608 A | 10/2000 | Rother | |
| 6,240,365 B1 | 5/2001 | Bunn | |
| 6,259,405 B1 | 7/2001 | Stewart et al. | |
| 6,301,480 B1 | 10/2001 | Kennedy, III et al. | |
| 6,326,918 B1 | 12/2001 | Stewart | |
| 2002/0068549 A1 * | 6/2002 | Tendler | 455/414 |

FOREIGN PATENT DOCUMENTS

| | | |
|---|---|---|
| EP | 0 569 243 A1 | 11/1993 |
| EP | 0 675 341 A1 | 10/1995 |

OTHER PUBLICATIONS

M. Krebs, "Cars That Tell You Where to Go," *The New York Times*, Dec. 15, 1996, section 11, p. 1.

L. Kraar, "Knowledge Engineering," *Fortune*, Oct. 28, 1996, pp. 163-164.

S. Heuchert, "Eyes Forward: An ergonomic solution to driver information overload," *Society of Automobile Engineering*, Sep. 1996, pp. 27-31.

J. Braunstein, "Airbag Technology Takes Off," *Automotive & Transportation Interiors*, Aug. 1996, p. 16.

I. Adcock, "No Longer Square," *Automotive & Transporation Interiors*, Aug. 1996, pp. 38-40.

\* cited by examiner

| 1901 | 1903 |
|---|---|
| AIR CONDITIONING | LINK TO CLIMATE CONTROL SCREEN OF FIG. 18 |
| ANTI-LOCK BRAKE SYSTEM INDICATOR | LINK TO WARNING LIGHT OPTION #4 ON FUEL/TEMP SCREEN (NOT SHOWN) |
| AUTOMATIC CLIMATE CONTROL | LINK TO CLIMATE CONTROL SCREEN OF FIG. 18 |
| ... | ... |
| CHARGING SYSTEM FAILURE INDICATOR | LINK TO CHARGING SYSTEM FAILURE OPTION 1309f (FIG. 16) |
| CLIMATE CONTROL SYSTEM | LINK TO CLIMATE CONTROL SCREEN OF FIG. 18 |
| COOLING | LINK TO CLIMATE CONTROL SCREEN OF FIG. 18 |
| CRUISE CONTROL INDICATOR | LINK TO WARNING LIGHT OPTION #2 ON SPEEDOMETER SCREEN (NOT SHOWN) |
| DEFOG/DEFROST | LINK TO CLIMATE CONTROL SCREEN OF FIG. 18 |
| DOOR AJAR INDICATOR | LINK TO WARNING LIGHT OPTION #7 ON FUEL/TEMP SCREEN (NOT SHOWN) |
| DIRECTIONAL SIGNALS INDICATOR | LINK TO TURN SIGNAL/HAZARD WARNING OPTION 1201b (FIG. 15A) |
| ... | ... |

FIG. 22

TECHNIQUE FOR SELECTING A SERVICE PROVIDER TO SERVICE A VEHICLE

This application is a division of U.S. application Ser. No. 09/848,391 filed on May 3, 2001 now U.S. Pat. No. 6,577,928, which is a continuation of U.S. application Ser. No. 09/355,433 accorded a filing date of Jul. 27, 1999 now U.S. Pat. No. 6,282,464, which is a National Stage of International Application No. PCT/US98/01119 filed on Jan. 5, 1998, and which is a continuation-in-part of U.S. application Ser. No. 08/789,934 filed on Jan. 28, 1997, maturing into U.S. Pat. No. 6,009,355 issued on Dec. 28, 1999.

TECHNICAL FIELD

The invention relates generally to information and control systems and, more particularly, to a system for use in an automobile which facilitates a user's retrieval and/or dissemination of information, and control of vehicle functions.

BACKGROUND OF THE INVENTION

Information is vital to day-to-day activities. With no access to information, people cannot function efficiently in this society, and their lives and financial well-being are put in jeopardy. People want to be well-informed, so much so that when they are travelling in automobiles, they tune into local radio stations to listen to news, weather forecasts and traffic conditions. For that matter, some automobiles are equipped with audiovisual systems including television (TV) receivers. One such system is disclosed in U.S. Pat. No. 5,404,443 issued to Hirata. The Hirata system provides audiovisual information in a number of modes including a TV mode, which may be selected by control switches disposed on the periphery of a display.

Automobile users like to be continually updated with information affecting their travel plans such as weather and traffic conditions because of its fast changing nature. Automobile users who are traveling also like to continually keep in touch with their homes and offices, and to confirm appointments and hotel reservations so that they can adjust their itineraries accordingly. To that end, cellular mobile telephones were introduced to enable automobile users to conduct business and contact their families while they are traveling.

In addition, local map information is important to automobile travelers moving from one locale to another. As such, navigation systems were developed to help reach their destinations in an unfamiliar milieu. One such vehicle navigation system is disclosed in U.S. Pat. No. 5,274,560 issued to LaRue. The disclosed system is based on artificial intelligence and provides a driver with directions via a voice interface. The system is built upon an optical disk player which can be used for entertainment as well. Digitized maps, compressed voice records and computer programs are stored on an optical disk compatible with the disk player. After a destination point is identified, the disclosed system finds the best route from the digitized maps and guides the driver therethrough via the voice interface, taking into account the latest traffic conditions received by an FM receiver to avoid congestion.

Recently, navigation systems based on military global positioning system (GPS) technology have emerged. One such navigation system is commercially available as an option for the latest model of the ACURA 3.5 RL automobile. This ACURA navigation system receives signals from a constellation of satellites which is part of the GPS. In response to these signals, the navigation system pinpoints the automobile's location (in latitude and longitude). It also detects the automobile's speed and direction. With geographic information stored on a hard disk in an onboard computer, the navigation system is capable of verbally and visually communicating to the user instructions for reaching the destination.

In addition to the above techniques for communications with automobile users, a technique for disseminating information regarding the automobiles themselves is disclosed in U.S. Pat. No. 5,442,553 issued to Parillo. The disclosed system is a vehicle diagnostic and software upgrade system. In this system, sensors are provided in the vehicle to generate dynamic data relating to various mechanical controls and the engine of the vehicle, including engine R.P.M., fuel/air mixture, emissions and pollution content information. A microprocessor in the vehicle has access to selectable program parameters affecting the functioning of the mechanical controls. The microprocessor collects and transmits the dynamic data to a remote diagnostic station periodically or upon its request. In response, the remote station sends, to the vehicle, signals indicative of any changes in its software and/or program parameters. The microprocessor accordingly causes the changes to be made in the vehicle based on the received signals.

Besides the communication capabilities described above, an automobile has many accessories and user control elements such as lights, wipers, a clock, temperature control, cruise control, seat adjustment control, mirror adjustment control, and an anti-theft system. A technique for centralizing the command of the individual control elements is disclosed in U.S. Pat. No. 5,555,502 issued to Opel. The disclosed system includes a centralized control panel on a steering wheel which, together with a display, is utilized to control the electronic components of the automobile. The display is positioned in the area of the driver's sun visor. After the driver presses one of the buttons on the control panel corresponding to a desired electronic component, a menu is displayed so that the driver is able to select items from the menu to program the component. The selection is accomplished by pressing specified buttons on the panel In addition, a technique for controlling vehicle accessories via voice command is disclosed in U.S. Pat. No. 4,827,520 issued to Zeinstra. In accordance with this technique, control functions of each accessory are formatted in a summary page for display on a screen, which is scanned by infrared light to sense any touching thereon. By uttering any of the displayed functions on the summary page, preceded by either a specified keyword or an actuation of a push-to-talk switch on a steering wheel, a more detailed subpage of the selected function is displayed for further selection by voice. As an alternative to the voice command, the selection can also be accomplished by touching the displayed function on the screen.

Voice command and touch screen techniques are frequently mentioned in prior art references in controlling car accessories. In particular, U.S. Pat. No. 5,214,707 issued to Fujimoto et al. discloses a system for voice-controlling equipment inside a vehicle, including microphones capable of discriminating voice commands as to whether they are generated at the driver side or at the assistant side of the vehicle in a noisy environment.

SUMMARY OF THE INVENTION

It is celebratory that technology advances at lightning speed. However, many people are left behind the technological frontier, and to some extent develop "technophobia". Some of them have even given up this technological race, which is confirmed by the blinking "12:00" display on the clocks of many video cassette recorders (VCRs) being used.

Similarly, it is fantastic that automobiles nowadays include many advanced accessories such as audiovisual systems, anti-theft systems, anti-lock brake systems, climate control, and cruise control which embrace the latest technologies. However, of all these accessories, many automobile users only know how to operate the headlights and windshield wipers, and regard the rest as nuisance. That is, the users pay for numerous accessories which they do not use, resulting in much consumer waste. We have recognized that such non-use is principally attributed to an inefficient distribution of operating knowledge of the automobile and, in particular, its accessories.

Specifically, when automobile users presently want to learn about certain aspects of an automobile, they need to consult an owner's manual which could have been lost or misplaced when they need it the most. In addition, the manual is unpopular because many users simply want to avoid reading any written material, and find it intimidating as it oftentimes is filled with incomprehensible technical jargon.

We have further recognized that even with the operating knowledge, many users are overwhelmed and confused with the large number of knobs, switches and buttons used to control the individual vehicle parts and accessories.

Accordingly, it is an object of the invention to design an information and control system for use inside an automobile with the user in mind. The user is afforded a centralized control which may be used in lieu of the knobs, switches and buttons to operate the vehicle parts and accessories. In accordance with the invention, the centralized control is intimately tied to an information system such that the user is able to efficiently access information about the functions and operations of such parts and accessories, and in a synergistic manner apply that information to operate same, using the centralized control.

It is another object of the invention that the access to the information is intuitive and direct so that the user can obtain the relevant information in a few self-explanatory steps. To that end, the invention embraces a multimedia approach where audio and video media are added to the traditional text media to convey information. The additional media increases the dimensions of both the user's comprehension of the information and the user's interaction with the automobile. Moreover, the information access is driven by a multilevel menu based on an intuitive model of taxonomy where information is organized in a minimal number of levels of subject matter from general to specific. The above integration of the multimedia approach with the multilevel menu approach presents an effective way of retrieving information in the automobile. Advantageously, with the invention, the user would not be distracted or overburdened by irrelevant information in the course of an information retrieval, which is conducive to a safe driving environment.

In the preferred embodiment, when the user wants to access information about a given part or accessory of the automobile, the user is presented with options on a display screen. Each option is associated with a respective one of different parts or accessories of the automobile. The user is able to select through the interface one of the options, associated with the given automobile part or accessory. The option when selected is highlighted, for example, in yellow. A voice is then generated by the inventive system to explain the purpose or the content of the selected option before the user commits to it. Having been so informed, the user may then activate the selected option in retrieving the information of interest. The retrieved information is presented to the user in text, voice and/or graphics.

BRIEF DESCRIPTION OF THE DRAWING

Further objects, features and advantages of the invention will become apparent from the following detailed description taken in conjunction with the accompanying drawing showing an illustrative embodiment of the invention, in which:

FIG. 22 is a look-up table listing searchable items and the corresponding instructions for a processor in the system of FIG. 1 to provide information regarding such items.

Throughout this disclosure, unless otherwise stated, like elements, components and sections in the figures are denoted by the same numerals.

DETAILED DESCRIPTION

Figure 1:
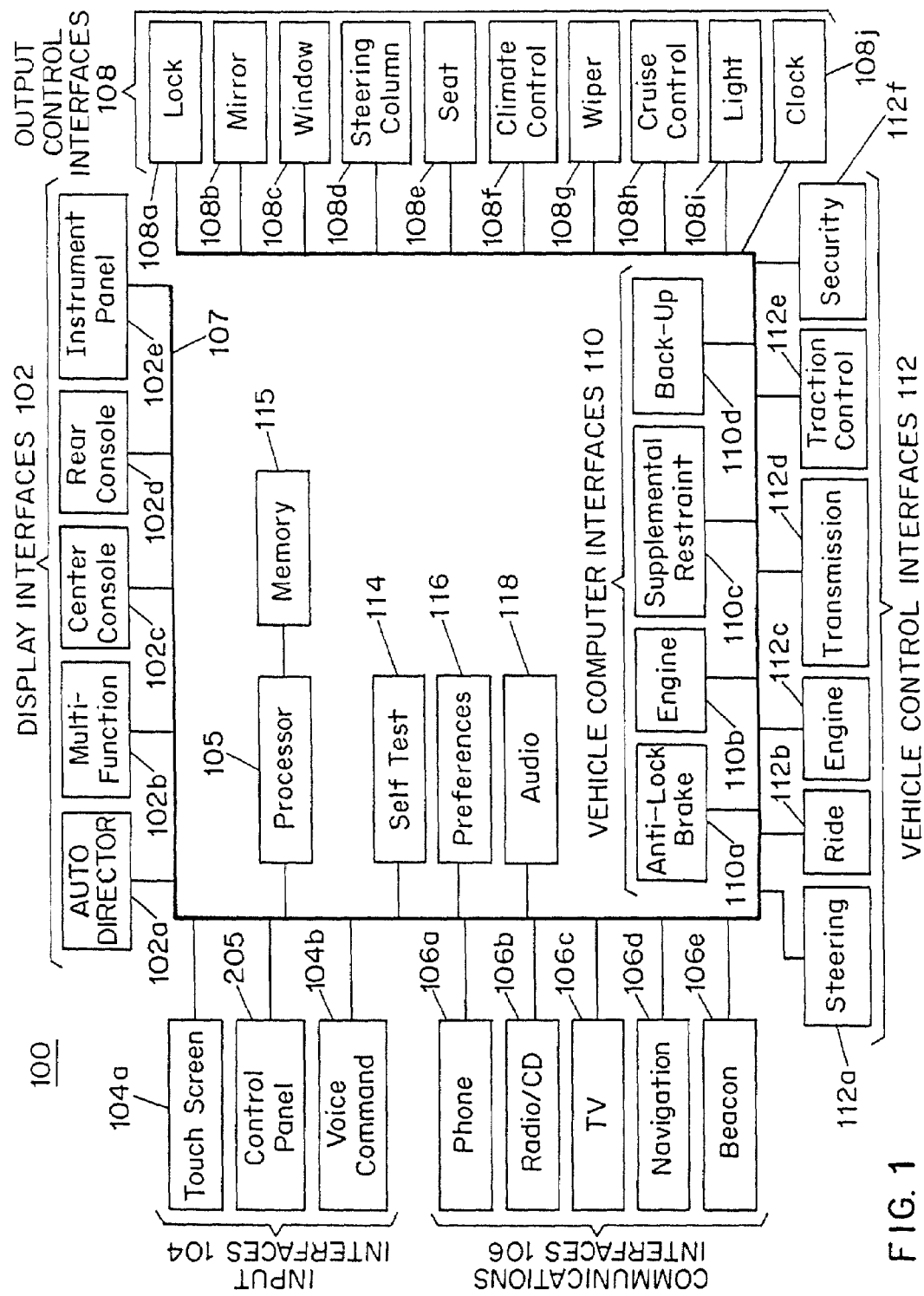
FIG. 1 is a block diagram of an automobile information and control system in accordance with the invention.

FIG. 1 illustrates information and control system 100 embodying the principles of the invention for use in an automobile. System 100 is referred to as the "AUTO DIRECTOR" system. It is user-friendly and designed with the automobile user in mind. For example, with AUTO DIRECTOR display interface 102a to be described, information about the automobile is readily available literally at the fingertips of the user. This information includes operational instructions, maintenance procedures, safety measures, and information about virtually every capability of the automobile. In accordance with the invention, the user is able to efficiently access such information using multimedia means involving audio, text and video media. Also with interface 102a, or multifunction display interface 102b to be described, the user is afforded a centralized control whereby he/she can program or adjust different vehicle parts and accessories using the information thus obtained.

As shown in FIG. 1, central to system 100 is processor 105 connected to memory 115. Data bus 107 connects processor 105 to display interfaces 102, input interfaces 104, communications interfaces 106, output control interfaces 108, vehicle computer interfaces 110, vehicle control interfaces 112, self-test interface 114, preferences interface 116, and audio interface 118.

Figure 2:
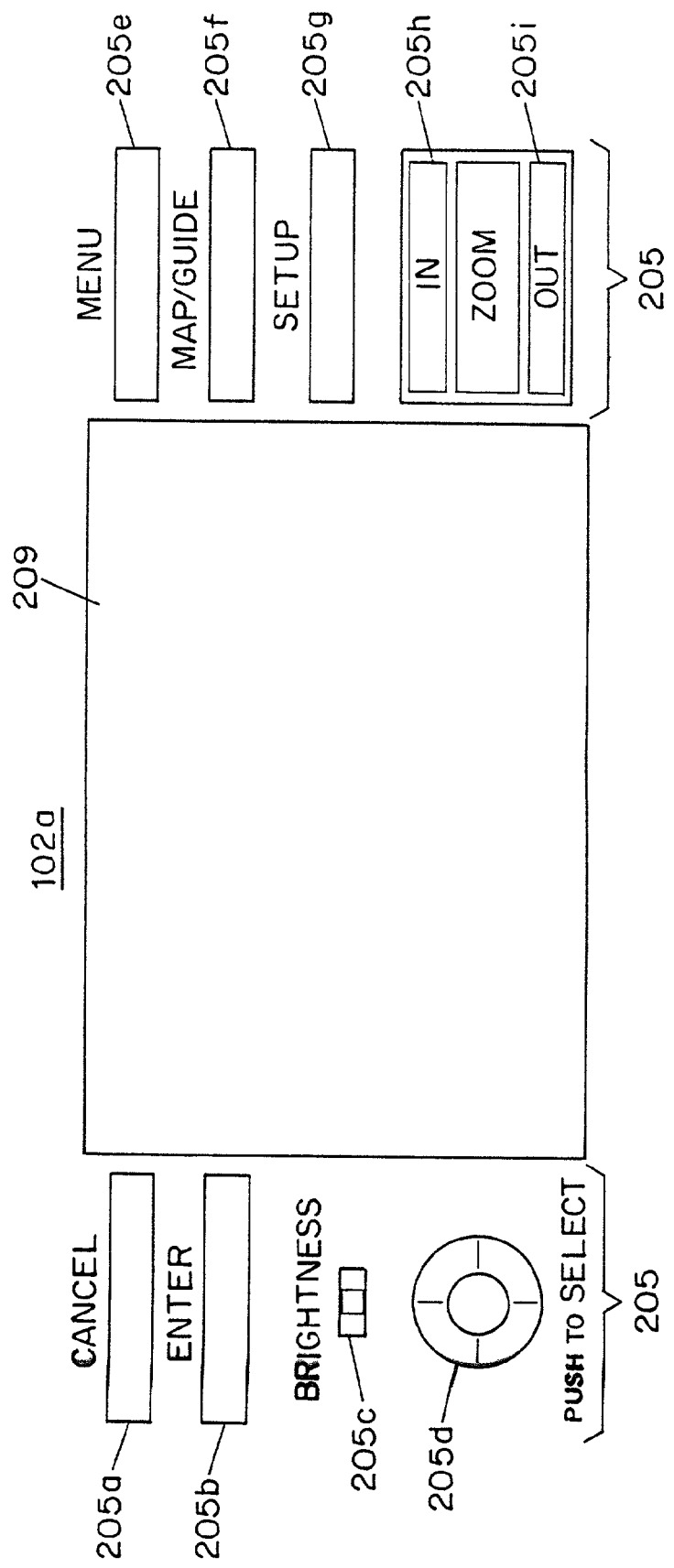
FIG. 2 illustrates a control panel and a display interface for a user to interact with the system of FIG. 1.

Display interfaces 102 include, inter alia, AUTO DIRECTOR display interface 102a, which is illustrated in FIG. 2, together with control panel 205 in FIG. 1. By way of example, but not limitation, the hardware of interface 102a and control panel 205 are derived from a prior art navigation system of the type of the ACURA navigation system. In fact, interface 102a and control panel 205 are used in this illustrative embodiment to realize not only AUTO DIRECTOR functions to be described, but also the well-known navigation function.

Interface 102a includes a conventional liquid crystal display screen 209, and LCD driver (not shown) for processor 105 to control the display on screen 209. Interface 102a also incorporates well-known touch-screen circuitry (not shown) connected to touch screen interface 104a in FIG. 1. With this circuitry, the user can interact with processor 105 by, say, touching a displayed option on screen 209. Through interface 104a, processor 105 receives from the touch screen circuitry a signal identifying the location on screen 209 where it has been touched. If such a location matches the predetermined location of one of the displayed options, processor 105 determines that that option has been selected. With such touch-screen and displayed option selection capabilities, through AUTO DIRECTOR interface 102a, the user is able to obtain information on and control selectable functions of the automobile such as the instrument panel, navigation function, mobile phone, radio/CD player, locks, mirrors, windows, driver's seat adjustment control, climate control, windshield wipers, cruise control, lights, security function, steering, ride control, engine and transmission.

Control panel 205 comprises CANCEL switch 205a, ENTER switch 205b, BRIGHTNESS switch 205c, PUSH TO SELECT knob 205d, MENU switch 205e, MAP/GUIDE switch 205f, SETUP switch 205g, ZOOM IN switch 205h and ZOOM OUT switch 205i. BRIGHTNESS switch 205c comprises a standard variable resistor such that when it is pushed one way, operating circuitry 121 responsively causes the display intensity to increase, and the other way to decrease. ZOOM IN switch 205h when pressed enables the automobile user to enlarge a particular visual area of interest on screen 209, affording better details. On the other hand, ZOOM OUT switch 205i when pressed performs the inverse function to switch 205h. As an alternative to the touch-screen capability, switch 205d similar to a standard joystick is provided for the user to move from one displayed option to another on screen 209 in the same direction (e.g., up, down, left or right) as the switch is operated. A desired option may be selected by pressing ENTER switch 205b. The functions of the other switches are described hereinbelow as they are called out in the operation of system 100. In this illustrative embodiment, AUTO DIRECTOR display interface 102a and control panel 205 are mounted close to the center of the dashboard of the automobile next to the steering wheel.

Referring back to FIG. 1, display interfaces 102 also include multifunction display interface 102b, center console display interface 102c, rear console display interface 102d, and instrument panel display interface 102e.

Specifically, multifunction display interface 102b is installed on the dashboard close to interface 102a on the driver side. Like interface 102a, interface 102b provides the user with graphic display and control of selected functions using well-known touch screen technology. In fact, interface 102b duplicates certain control functions (e.g., navigation, phone, radio and climate control) of interface 102a so that the user can use interface 102b to control a selected function while interface 102a is engaged in another ongoing function. For example, while the user is relying on AUTO DIRECTOR interface 102a to provide navigation information to reach a given destination, the user may want to adjust the climate control of the automobile. It is inconvenient for the user to terminate the ongoing navigation mode of interface 102a, albeit temporarily, to access the climate control function through the interface, adjust the climate control and then resume the navigation mode. Thus, it is preferable to leave the navigation mode of interface 102a alone and use interface 102b to administer the climate control.

Center console interface 102c is installed close to interface 102a on the passenger side. Similar to interface 102b, interface 102c provides the front seat passenger with graphic display and control of functions which include: the front passenger seat adjustment, door lock, window, climate and TV controls. If enabled by the driver, control is also available for the radio/CD player and phone.

Rear console display interface 102d is installed on the back of a front seat. Similar to interface 102c, interface 102d provides rear seat passengers with graphic display and control of certain functions if enabled by driver or front seat passenger. These functions include: the rear seat climate, windows, door locks, radio/CD player and TV controls.

Instrument panel display interface 102e is installed on the dashboard in front of the driver seat. This interface provides the driver with graphic display of the vehicle speed, engine RPM, outside and inside temperatures, oil pressure, fuel level, time, odometer reading, trip odometer reading and warning light indicators. Through AUTO DIRECTOR interface 102a, the system user may select the display of the information in either an analog or a digital form.

Input interfaces 104 comprise touch screen interface 104a and control panel 205 described before, and voice command interface 104b. The latter is connected to a microphone (not shown) and comprises standard voice command circuitry (not shown) for processing voice commands by the user through the microphone to control or modify selected functions of system 100.

Communications interfaces 106 include phone interface 106a, radio/CD interface 106b, television (TV) interface 106c, navigation interface 106d, and beacon interface 106e. Processor 105 interacts with and controls standard phone equipment connected to phone interface 106a. Through processor 105, the user may operate the phone equipment via voice command, thereby realizing hands-free operation of the equipment. Alternatively, the user may operate the phone equipment using the touch screen capability provided by AUTO DIRECTOR display interface 102a or multifunction display interface 102b. The user may also operate the phone equipment via remote switches.

Similarly, processor 105 interacts with and controls one or more radio receivers and CD players in the automobile connected to radio/CD interface 106b. Through processor 105, the user may operate the radio receivers via voice command, remote switch and/or touch screen capability.

Processor 105 further interacts with and controls one or more TV receivers in the automobile connected to TV interface 106c. Again, the user may operate the TV receivers via voice command, remote switches and/or touch screen capability. It should be noted at this point that it is apparent to a person skilled in the art that wherever the touch screen capability may be used to select or control various options or functions provided by system 100, the voice command is equally applicable. As such, without further repetition, the explicit mention of use of the voice command as an alternative to that of the touch screen capability in each instance is conveniently omitted in the ensuing discussion.

As further described hereinbelow, navigation interface 106d is connected to a standard inertial guidance system (not shown) capable of providing gyros information, and deriving the vehicle location based on GPS information. With the map information stored in memory 115, the inertial guidance system is capable of providing the user with navigational instructions via interface 102a or 102b. Besides the locational information, local and national emergency information may be derived from the GPS information using additional standard decoding circuitry in interface 106d.

Beacon interface 106e is used for connection to a standard beacon device for detecting a predetermined beacon radio signal to provide additional locational information.

Output control interfaces 108 include lock interface 108a, mirror interface 108b, window interface 108c, steering column interface 108d, seat interface 108e, climate control interface 108f, wiper interface 108g, cruise control interface 108h, light interface 108i and clock interface 108j.

Specifically, lock interface 108a comprises output control logic controllable by processor 105 to lock or unlock the car doors, glove box, console storage, trunk (or liftgate), fuel filler door, brakes and transmission, and enable or disable the child-proof door locks, fuel pump and ignition.

Mirror interface 108b comprises output control logic controllable by processor 105 to maneuver the positions of the outside mirrors and inside rear view mirror, and to fold or unfold the outside mirrors.

Window interface 108c comprises output control logic controllable by processor 105 to incrementally or completely open or close all windows, and to open, close or tilt any sunroof.

Steering column interface 108d comprises output control logic controllable by processor 105 to move the steering column in or out and up or down.

Seat interface 108e comprises output control logic controllable by processor 105 to (1) adjust the positions of the front seats forward or aft, and up or down; (2) tilt the front or rear of the seat cushion up or down; (3) adjust the seat back lumbar, width and angle forward or aft; (4) increase or decrease the cushion size and stiffness; (5) raise or lower the head restraint; and (6) raise or lower the seat belt height.

Climate control interface 108f comprises output control logic controllable by processor 105 to (1) turn the climate control system on or off; (2) select an air flow mode; (3) set fan speeds; (4) enable or disable seat heaters; (5) select fresh or recirculated air (for driver only); and (6) enable or disable front and rear defrosters, mirrors and steering wheel heaters (for driver only).

Windshield wiper interface 108g comprises output control logic controllable by processor 105 to (1) select a high, low, intermittent, single wipe or off mode; (2) set an intermittent delay; and (3) enable or disable front or rear washers. Interface 108g also includes control logic for controlling rain- and speed-sensitive wipers, and for activating an automatic wash in a single wide mode when the windshield is at a certain level of opacity.

Cruise control interface 108h comprises output control logic controllable by processor 105 to (1) turn the cruise control on or off, (2) set the vehicle speed, and (3) cancel or resume the set speed.

Light interface 108i comprises output control logic controllable by processor 105 to select an automatic on mode or off mode for parking lights, headlights and fog lights; and to turn on or off map or courtesy lights.

Clock interface 108j comprises output control logic controllable by processor 105 to set an initial date and time on a conventional clock (not shown) connected to interface 108j. System 100 relies on the current date and time kept by the clock to provide a time reference for the system functions.

Vehicle computer interfaces 110 include anti-lock brake computer interface 110a, engine computer interface 110b and supplemental restraint computer interface 110c for processor 105 to communicate with the computers controlling the anti-lock brakes, engine and supplemental restraints (e.g., back-up airbag deployers and seat belt tensioners), respectively. Interfaces 110 also include back-up interface 110d through which processor 105 receives and analyzes signals from the engine, anti-lock brake and supplemental restraint computers. These signals would indicate to processor 105 any failures of the computers. In response to a computer failure, processor 105 causes a corresponding back-up computer connected to interface 110d to provide a back-up function.

Vehicle control interfaces 112 include steering interface 112a, ride interface 112b, engine interface 112c, transmission interface 112d, traction control interface 112e, and security interface 112f.

Specifically, steering interface 112a comprises input monitoring and output control logic for processor 105 to lighten or tighten the steering effort ratio in response to changing road conditions. Through interface 102a, the user may opt for manual or automatic steering effort ratio control. Interface 112a is capable of adapting and storing data according to the driver's inputs. It also allows for steering of front and/or rear wheels for sporty or increased stability.

Ride interface 112b comprises input monitoring and output control logic for processor 105 to lighten or stiffen the ride control to front and/or rear of vehicle in response to changing road conditions. Through interface 102a, the user may also opt for manual or automatic ride control.

Engine interface 112c comprises input monitoring and output control logic allowing for shutting off a specified number of cylinders, and varying valve and cam timing to increase performance or fuel economy. This interface also allows for manual or automatic control of the engine components, and includes the capability of adapting and storing data according to the driver's inputs.

Transmission interface 112d comprises input monitoring and output control logic for selecting manual or automatic shifting of the transmission. In an automatic shifting mode, interface 112d is capable of adapting and storing data according to the driver's inputs. Interface 112d also allows for control of a variable differential ratio for fast acceleration and high economy cruise.

Traction control interface 112e comprises input monitoring and output control logic providing information on whether power is delivered to front and/or rear wheels of the vehicle and what proportion of the power is delivered to each wheel. This interface also allows for manual or automatic control, and such functions as yaw control in cooperation with the anti-lock brakes and an engine cylinder shutoff.

Security interface 112f comprises control logic for setting a security level, and enabling or disabling a number of security related functions such as the fuel supply cut-off, motion detector, brake locking, etc. Interface 112f also allows entry of a new or alteration of an existing personal identification number (PIN) for personalization of the vehicle functions, i.e., saving the vehicle functional preferences.

In accordance with an aspect of the invention, system 100 incorporates an anti-car-theft technique involving security interface 112f. In accordance with this inventive technique, security interface 112f further comprises a sensor for detection of a predetermined condition to trigger an anti-theft routine. It will be appreciated that a person skilled in the art will come up with many different triggering events causing the sensor to invoke the routine. For example, a passive way of triggering the anti-theft routine would be after the sensor detects that the engine is off and the user has opened, closed and locked the driver's door.

Figure 3:
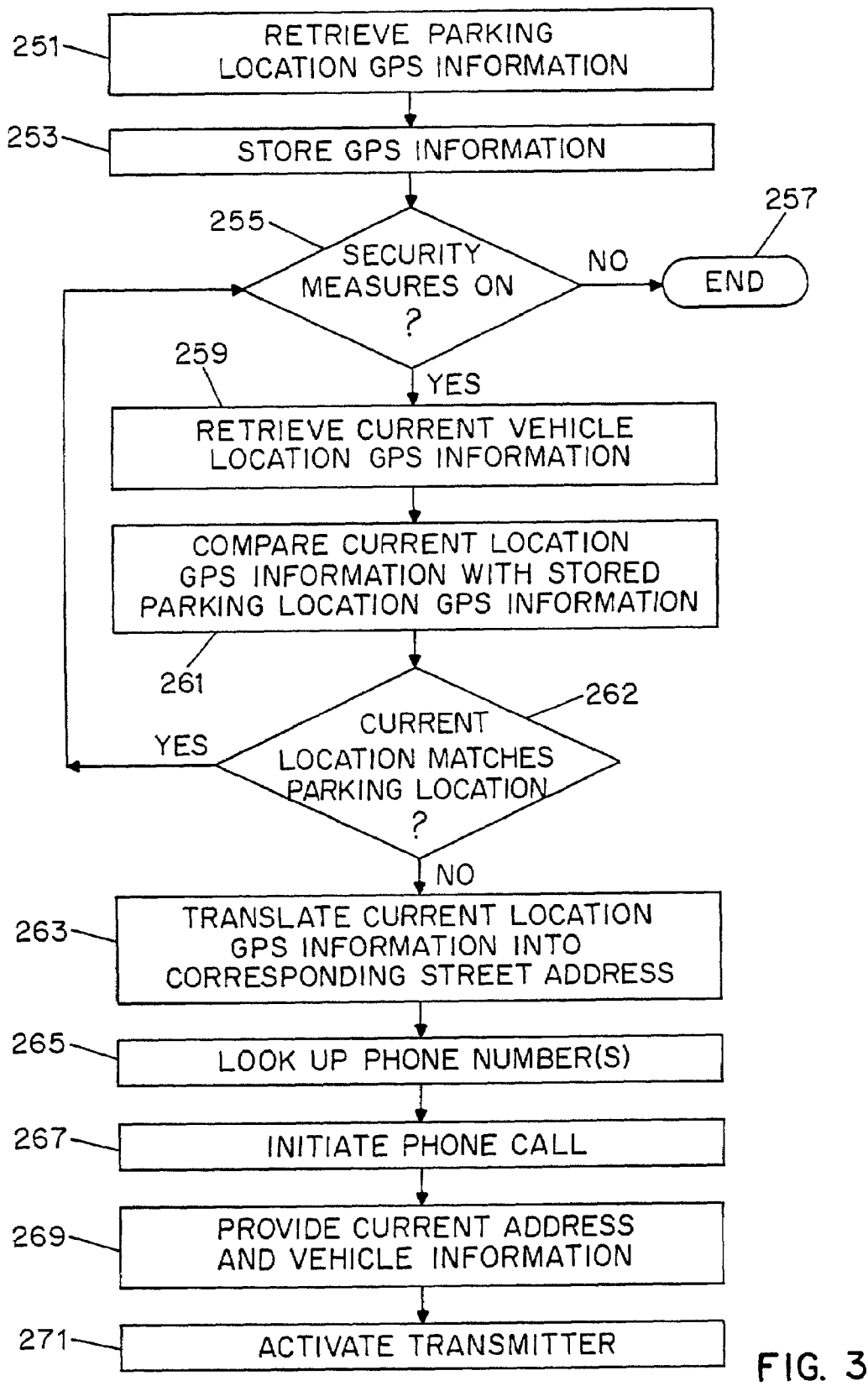
FIG. 3 illustrates a flow chart depicting the steps of an anti-car-theft routine used in the system of FIG. 1.

In any event, as soon as processor 105 receives from the sensor a signal requesting an invocation of the anti-theft routine, processor 105 retrieves from navigation interface 106d GPS information identifying the parking location of the automobile, as indicated at step 251 in FIG. 3. Processor 105 then stores at step 253 the parking location GPS information in memory 115. At step 255, processor 105 determines whether the security measures remain on. By way of example, but not limitation, such determination is based on information from lock interface 108a indicating whether the driver's door is properly unlocked. If that door is properly unlocked, processor 105 determines that the security measures are called off, and the anti-theft routine comes to an end, as indicated at step 257.

Otherwise if processor 105 determines that the security measures remain on, processor 105 at step 259 retrieves from navigation interface 106d GPS information identifying the current location of the automobile. Processor 105 then compares at step 261 the current location GPS information with the parking location GPS information previously stored. If processor 105 at step 262 determines that the current location matches the parking location based on the comparison, the anti-theft routine returns to step 255 after a predetermined period. Otherwise if processor 105 determines that the current location does not match the parking location, processor 105 assumes that the automobile has been removed without authorization, i.e., stolen. At this point, if a conventional alarm system is connected to security interface 112f, processor 105 would cause an alarm to come on, gas to be cut off, etc.

In this example, a conventional transmitter (not shown) is connected to security interface 112f and transmits a predetermined sequence of signals receivable by a law enforcement agency or a suitable alarm monitor company when it is activated. Continuing the example, processor 105 translates the GPS information identifying the current vehicle location into the corresponding street address based on the map information stored in memory 115, as indicated at step 263. Processor 105 at step 265 looks up one or more phone numbers pre-stored in memory 115 for reporting to the law enforcement agency (or the alarm monitor company) about the stolen status. Alternatively, a list of phone numbers associated with law enforcement agencies (or branches of the alarm monitor company) in many different geographic locations is pre-stored, along with the GPS information identifying the locations of the respective law enforcement agencies (or alarm monitor company branches). This being so, processor 105 locates the closest law enforcement agency (or alarm monitor company branch) and its associated phone number(s) by comparing the current vehicle location GPS information with the respective agency (or branch) location GPS information.

In any event, processor 105 at step 267 initiates a call to a law enforcement agency (or an alarm monitor company branch) through phone interface 106a using the phone number just located. After the phone connection is established, processor 105 provides through the connection information about the current address of the vehicle using conventional voice synthesizer circuitry (not shown) in audio interface 118, and the pre-recorded information about the vehicle itself such as its vehicle identification number (VIN), model, year, color, license number, etc., as indicated at step 269. Through the same phone connection, processor 105 may also provide information about the vehicle's owner such as his/her name and contact number so that the law enforcement agency (or alarm monitor company branch) can notify the owner of the incident. Processor 105 at step 271 activates the aforementioned transmitter connected to security interface 112f to generate the predetermined sequence of signals in case the stolen vehicle is in transit. For that matter, processor 105 can also repeatedly check on the latest vehicle location and report any new address different from the one previously reported. Thus, by tracking the signals in the vicinity of the latest reported vehicle location, the law enforcement agency (or alarm monitor company) would recover the vehicle in an efficient manner.

In accordance with another aspect of the invention, after processor 105 determines that the vehicle requires maintenance (e.g., based on cumulative RPM measures described below), relying on the GPS information concerning the current location of the vehicle and the GPS information identifying the locations of a predetermined list of service stations, processor 105 issues an alert to the user when it determines that the vehicle is currently within a predetermined distance from one of the service stations so that the user can conveniently drive to that nearby service station to have the vehicle serviced. To that end, the GPS information concerning the service station locations is stored in memory 115. After determining that the vehicle requires maintenance, processor 105 from time to time compares the GPS information concerning the current vehicle location with that concerning each service station in the list, thereby identifying the closest service station currently to the vehicle and the distance between them. If such a distance is within the predetermined distance, e.g., 5 miles, processor 105 causes a message to be displayed on AUTO DIRECTOR interface 102a and/or to be announced through audio interface 118 described below, informing the user about the closest service station. In addition, if interface 102a is put in a navigation mode, the GPS information concerning such a service station is used by the aforementioned inertial guidance system to direct the user there.

Referring back to FIG. 1, self-test interface 114 comprises input/output (I/O) control logic for performing an active self-test of system 100 on power up or at the user's request. Specifically, interface 114 polls every other interface in system 100 for a self-test result. Each interface, when polled, performs an active self-test and reports the test results to interface 114, where such test results are gathered and caused to be displayed on interface 102a.

Preferences interface 116 monitors changes made by the user in selected functions after the user logs on system 100, and prompts the user to save such preferences. These preferences are stored in memory 115 in association with the user's PIN. Functions affording the user choices include auto locks, an easy entry, auto lamps, the seat position, steering column position, mirror position, radio, steering, ride, transmission shift, engine performance, climate, and security level.

Audio interface 118 comprises I/O control logic for receiving audio signals from a radio/CD, TV, compact disk (CD) player, or phone interface, processing the received audio signals, providing proper amplifications thereto, and routing the resulting sound to appropriate speakers and headphones (not shown) connected to interface 118.

Figure 4:
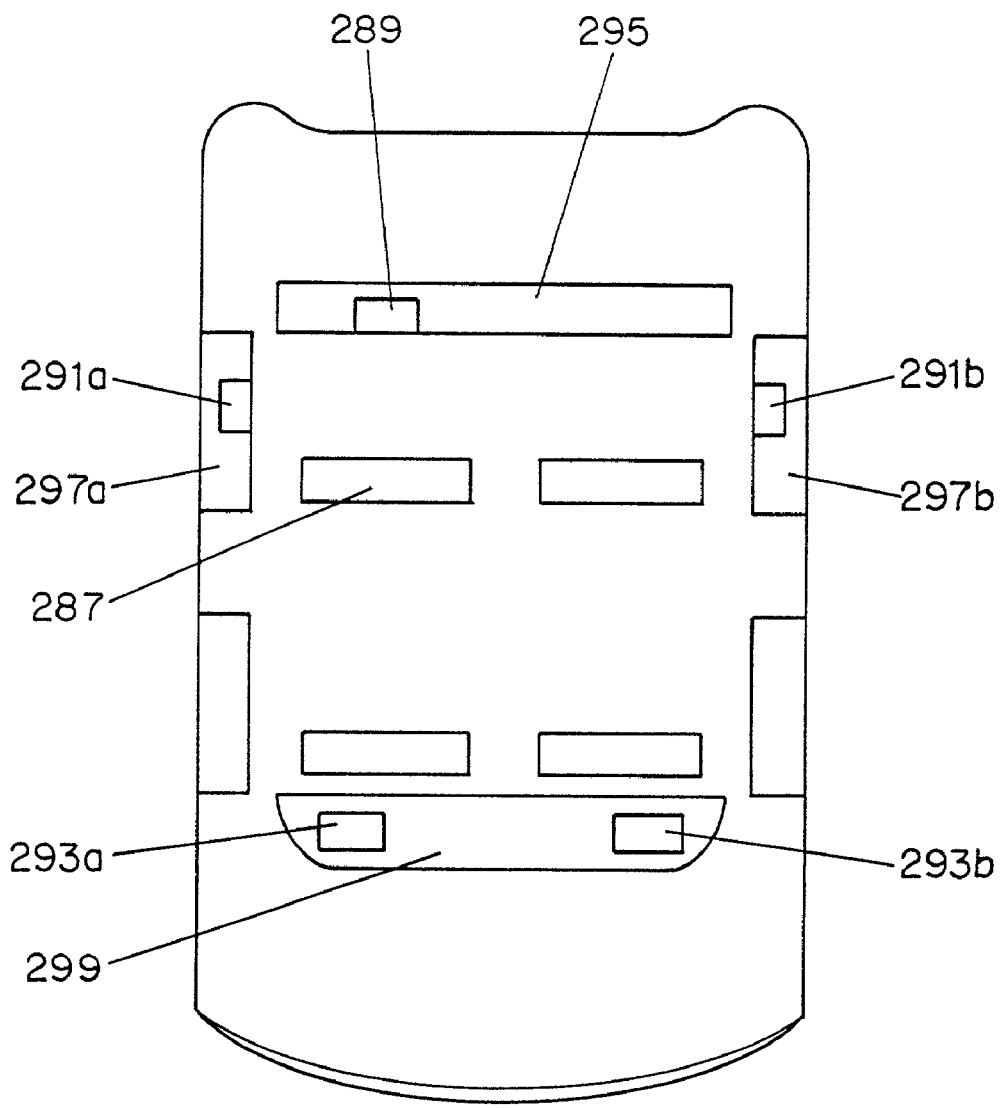
FIG. 4 illustrates an arrangement of speakers in an automobile in accordance with the invention.

In this illustrative embodiment, AUTO DIRECTOR display interface 102a and multifunction display interface 102b share the same speakers. As illustrated in FIG. 4, these speakers are central speaker 289, front left speaker 291a, front right speaker 291b, rear left speaker 293a and rear right speaker 293b. Central speaker 289 is installed on dashboard 295 directly opposite driver seat 287 in the automobile. In addition, speakers 291a and 291b are installed on the inside of front left door 297a and the inside of front right door 297b, respectively. Speakers 293a and 293b are respectively installed in left and right corners of rear shelf 299 in the automobile.

Interface 118 also provides center and rear console display interfaces 102c and 102d with separate audio channels, speakers and headphone outputs. The front and rear speakers may be muted by the user as a preference.

Interface 118 also processes requests from other interfaces for pre-recorded digital sounds stored in a SOUNDSGOOD library in memory 115 and routes the requested sounds to the appropriate interfaces. In addition, interface 118 comprises the conventional voice synthesizer circuitry for providing voice messages to the appropriate interfaces. Moreover, in accordance with another aspect of the invention, the voice messages and any accompanying digital sounds are routed to selected ones of speakers 289, 291a, 291b, 293a and 293b to effectively deliver the messages to the user. For instance, if the messages are extremely important, e.g., messages requiring actions to be taken immediately, to capture the full attention of the user, such messages may be routed to central speaker 289 and thereby directed toward the face of the user. If the messages are less important, e.g., advisories requiring actions to be taken sometime but not immediately, such messages may be routed to front speakers 291a and 291b. If the messages are still less important, e.g., driving tips and other messages for information only, such messages may be routed to rear speakers 293a and 293b, rendering the effect of background information.

Figure 5A:
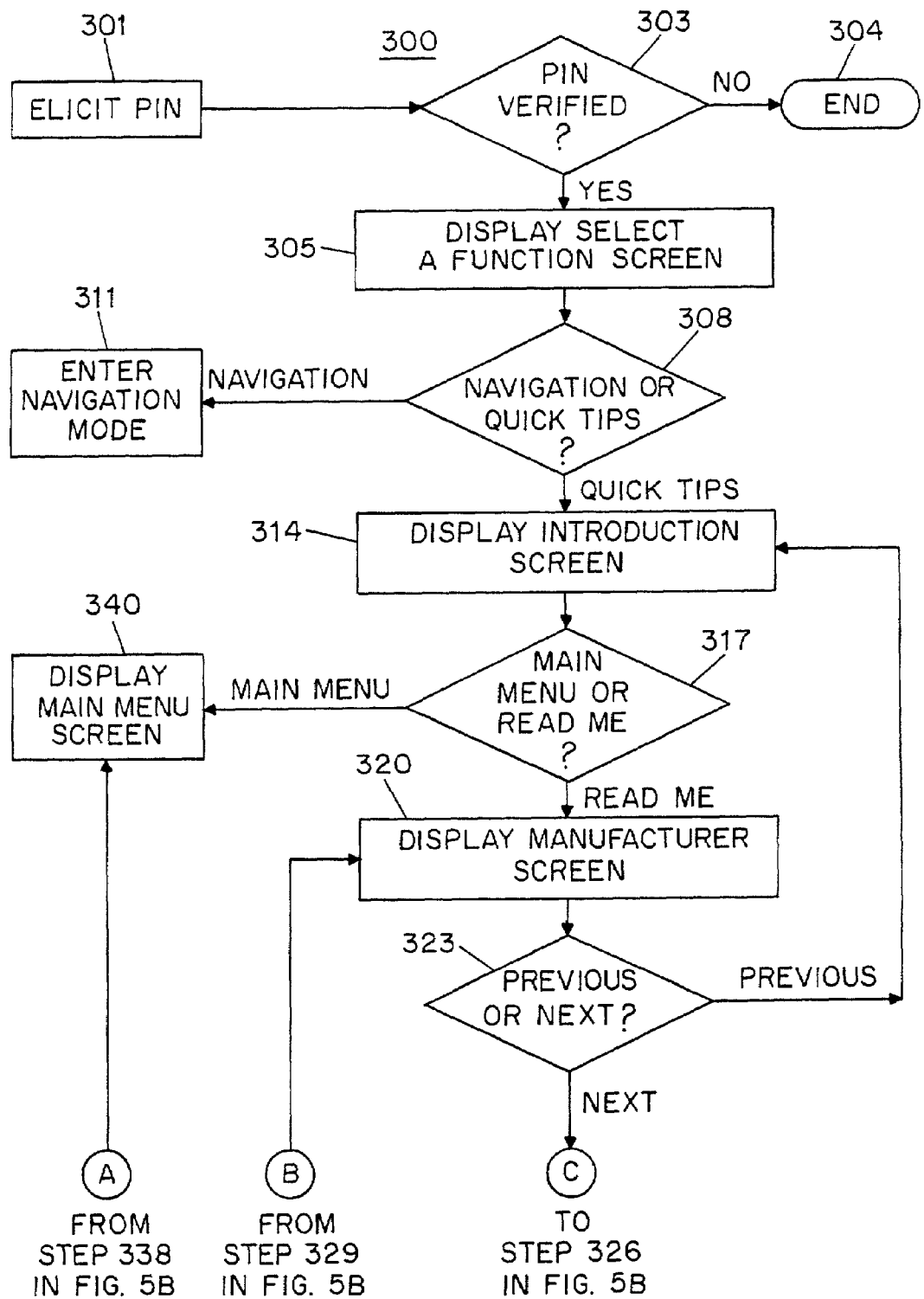
FIGS. 5A and 5B jointly illustrate a flow chart depicting the steps of a routine for presenting various screens to the user in the system interaction.
Figure 5B:
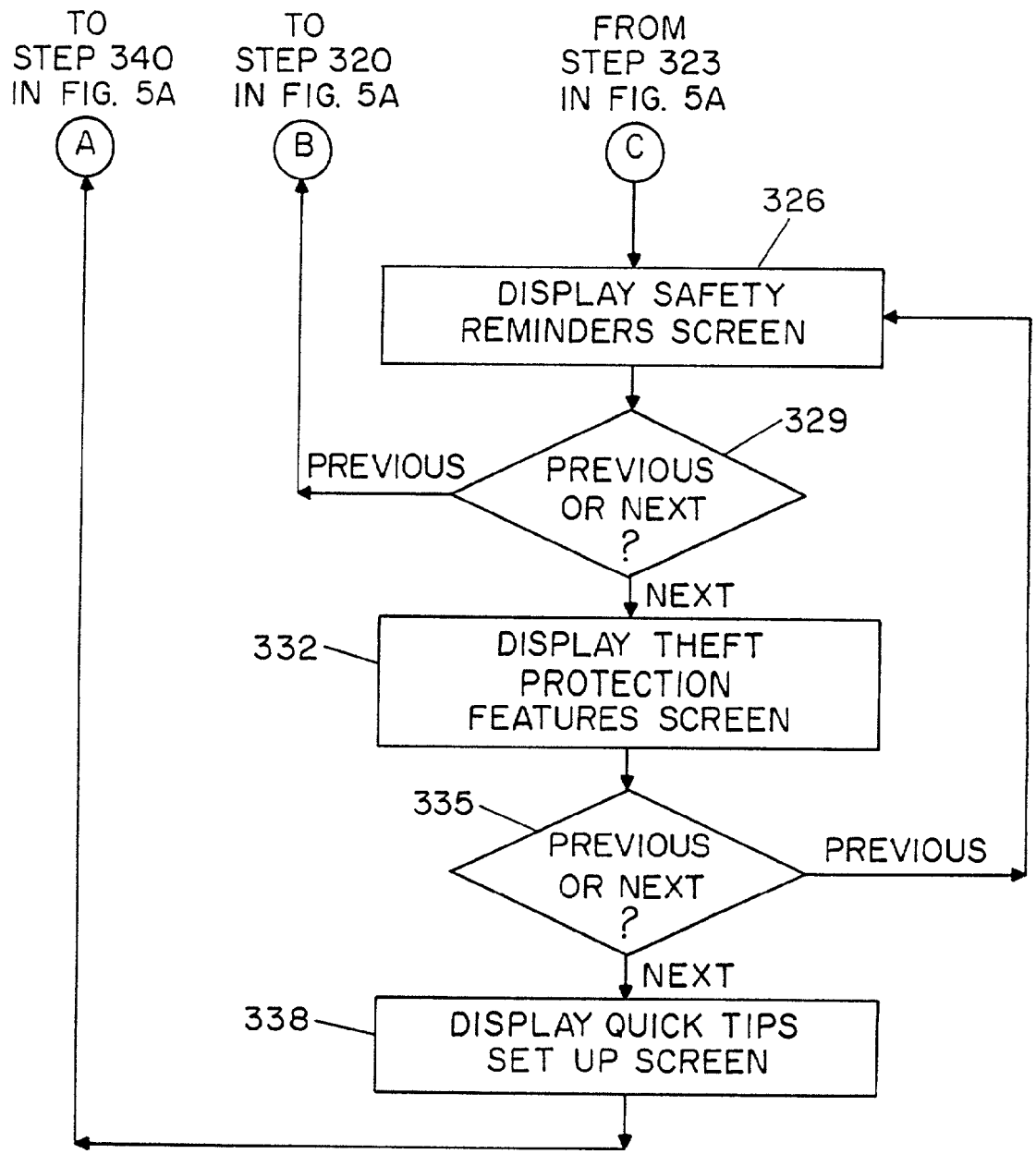
Figure 6:
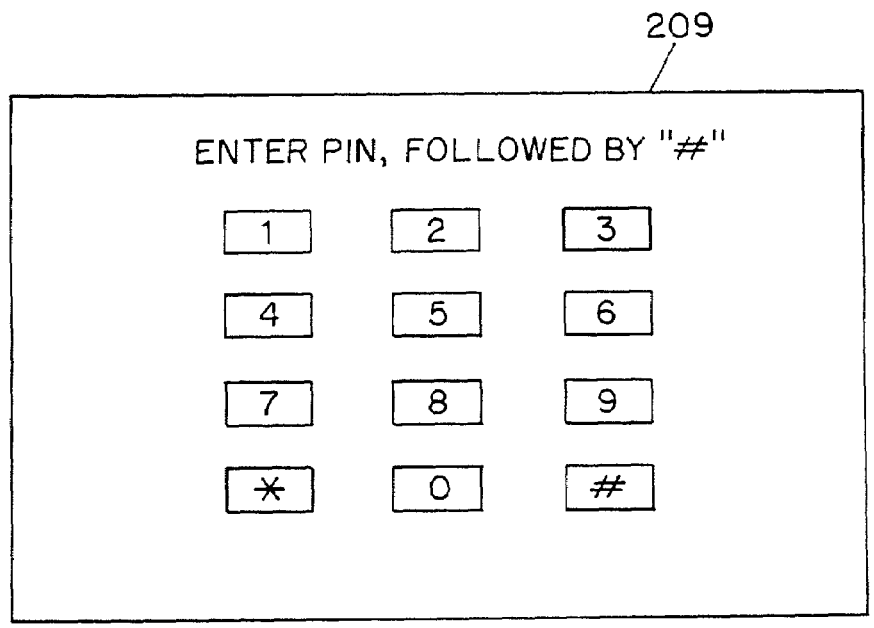
FIG. 6 illustrates a screen for eliciting a personal identification number (PIN) from the system user.

FIGS. 5A and 5B jointly illustrate routine 300 for accessing, through AUTO DIRECTOR display interface 102a, a main menu to obtain operational instructions, maintenance procedures, safety measures, and other information about the automobile, collectively referred to as "Quick Tips". Routine 300 is stored in memory 115 and initiated when SETUP switch 205g in FIG. 2 is pressed. Instructed by routine 300, processor 105 at step 301 elicits a PIN from the user by displaying a screen of FIG. 6 through interface 102a. As shown in FIG. 6, a video key-pad comprising numeral keys "1" through "9", and "*" and "#" keys are displayed on screen 209. In response, the user enters a sequence of numerals by touching the corresponding displayed keys, followed by the "#" key.

It should be pointed out that in accordance with another aspect of the invention, when a displayed key or option is touched on the screen of AUTO DIRECTOR display interface 102a or multifunction display interface 102b, a tone pre-selected by the user from the SOUNDSGOOD library is generated through audio interface 118, indicating that the key or option has been touched on the screen. Advantageously, relying on the audio tone confirmation, as opposed to a visual confirmation, the user while driving can continually watch the road.

The user may alternatively enter the above numeral sequence using control panel 205 in a manner to be described. In any event, processor 105 then verifies at step 303 the PIN entry by comparing it with the user's pre-selected PIN. The latter is stored in memory 115, along with the user's preferences. In a standard way, the user is given a few chances to enter a correct PIN. Verification of the PIN entry identifies the user as a legitimate user. Thus, if the PIN entry is not valid, routine 300 comes to an end, as indicated at step 304.

Figure 7:
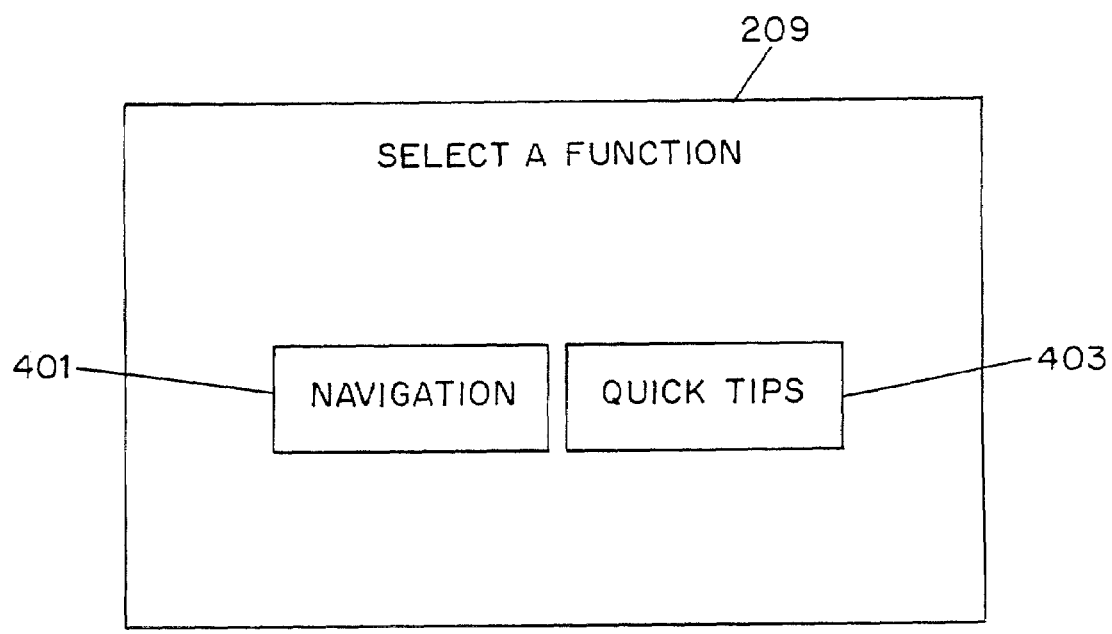
FIG. 7 illustrates a SELECT A FUNCTION screen including features thereof in accordance with the invention.

Otherwise if the PIN entry is valid, processor 105 at step 305 causes interface 102a to display on screen 209 a "SELECT A FUNCTION" screen, which is illustrated in FIG. 7. As shown in FIG. 7, two options, namely, "NAVIGATION" and "QUICK TIPS", are displayed on screen 209. By default, NAVIGATION option 401 is highlighted yellow when the screen of FIG. 7 appears.

It should be pointed out that in this illustrative embodiment, a yellow highlight on an option indicates that the option is selected but not yet activated. Once a yellow highlighted option is activated, the option is highlighted blue momentarily. System 100 then performs according to the activated option.

Thus, in this instance, the user may activate the yellow highlighted NAVIGATION option by touching the option on screen 209 or by pressing ENTER switch 205b.

However, if QUICK TIPS option 403 is desired, the user may touch that option on screen 209, which would then be highlighted yellow. A second touch on the same option will change the highlight to blue, indicating the active status. As an alternative, the user may utilize knob 205d of FIG. 2 to select QUICK TIPS option 403 by first pushing the knob to the right. In response, processor 105 causes the yellow highlight to move from default NAVIGATION option 401 to QUICK TIPS option 403. The user can then select the QUICK TIPS option by pressing ENTER switch 205b. Upon selection, the yellow highlighted option will again turn blue.

Processor 105 at step 308 detects an activation of either NAVIGATION option 401 or QUICK TIPS option 403. If NAVIGATION option 401 is activated, processor 105 at step 311 causes system 100 to enter into a navigation mode. In this mode, processor 105 causes navigational instructions to be displayed on screen 209 in a conventional manner. In providing the navigation instructions, the standard inertial guidance system connected to navigation interface 106d receives signals from a constellation of GPS satellites maintained and controlled by the U.S. Department of Defense. In response to these signals, the inertial guidance system identifies the location (in longitude and latitude) of the automobile. The system also detects the vehicle speed, and the direction in which the vehicle is headed. By accessing the map information stored in memory 115, the system is capable of visually and verbally providing the user with directions to a given destination through AUTO DIRECTOR display interface 102a and audio interface 118, respectively.

Otherwise if activation of QUICK TIPS option 403 is detected at step 308, processor 105 causes interface 102a to display an introduction screen on screen 209, as indicated at step 314. This introduction screen is illustrated in FIG. 8.

Figure 8:
FIG. 8 illustrates an introduction screen including features thereof in accordance with the invention.

As shown in FIG. 8, system source identification, warning and instructional information appear on the introduction screen, along with two options, "MAIN MENU" and "READ ME". The default option in this instance is READ ME option 501 which is highlighted yellow. Processor 105 detects at step 317 whether MAIN MENU option 503 or READ ME option 501 is activated. If MAIN MENU option 503 is activated, routine 300 proceeds to step 340 to be described. Otherwise if READ ME option 501 is activated, routine 300 proceeds to step 320 where processor 105 causes a series of three screens to be displayed. The first screen of the series is a "MANUFACTURER" screen, which is illustrated in FIG. 9.

Figure 9:
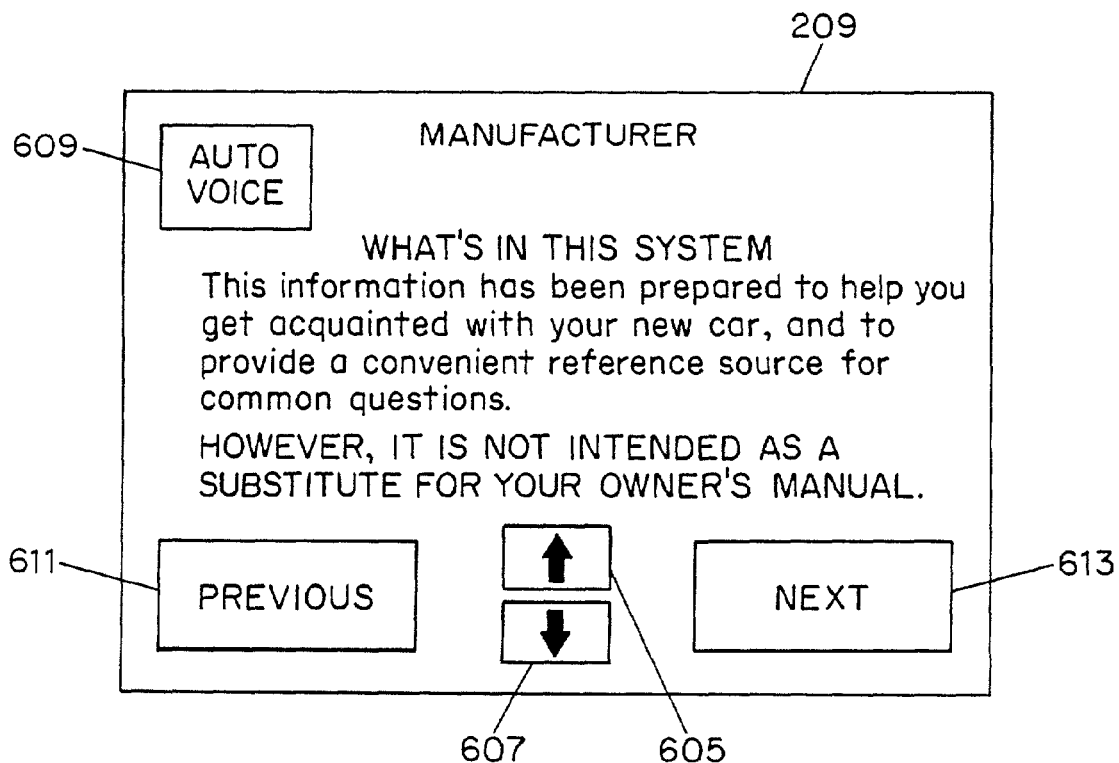
FIG. 9 illustrates a MANUFACTURER screen including features thereof in accordance with the invention.

As shown in FIG. 9, a description of the QUICK TIPS system appears on the MANUFACTURER screen. If the text to be displayed exceeds one screen, which is the case here, scrolling options comprising scroll-up option 605 and scroll-down option 607 are provided. When option 605 is touched and activated on screen 209, additional text scrolls up one paragraph at a time. Option 607 performs an inverse function to option 605. Again, as an alternative, the user may maneuver PUSH TO SELECT knob 205d until the desired scroll option (or direction arrow) is highlighted yellow. The activation of the highlighted option is achieved by pressing ENTER switch 205b.

By default, displayed option 609 has the "AUTO VOICE" wording thereon and is highlighted blue as the MANUFACTURER screen comes on. Accordingly, a pre-recorded voice is activated by processor 105 through audio interface 118 to read the entire text associated with this screen without interruption, including the text which is not presently shown on screen 209 but otherwise shown upon scrolling. To alter the AUTO VOICE function, the user may touch option 609 on screen 209, or alternatively press ENTER switch 205b. By doing so, the "AUTO VOICE" wording on option 609 changes to "MANUAL VOICE", which is highlighted blue, indicating its active status.

In accordance with the MANUAL VOICE function, a pre-recorded voice reads the displayed text only, and stops reading until additional text is scrolled onto the screen. To silence the voice, the user may again touch option 609 on screen 209, or alternatively press ENTER switch 205b. By doing so, the "MANUAL VOICE" wording on option 609 changes to "VOICE OFF", and the voice is deactivated, with the option now highlighted yellow. The cycle of the AUTO VOICE, MANUAL VOICE and VOICE OFF functions can be repeated by successively touching option 609 or pressing switch 205b.

Figure 10:
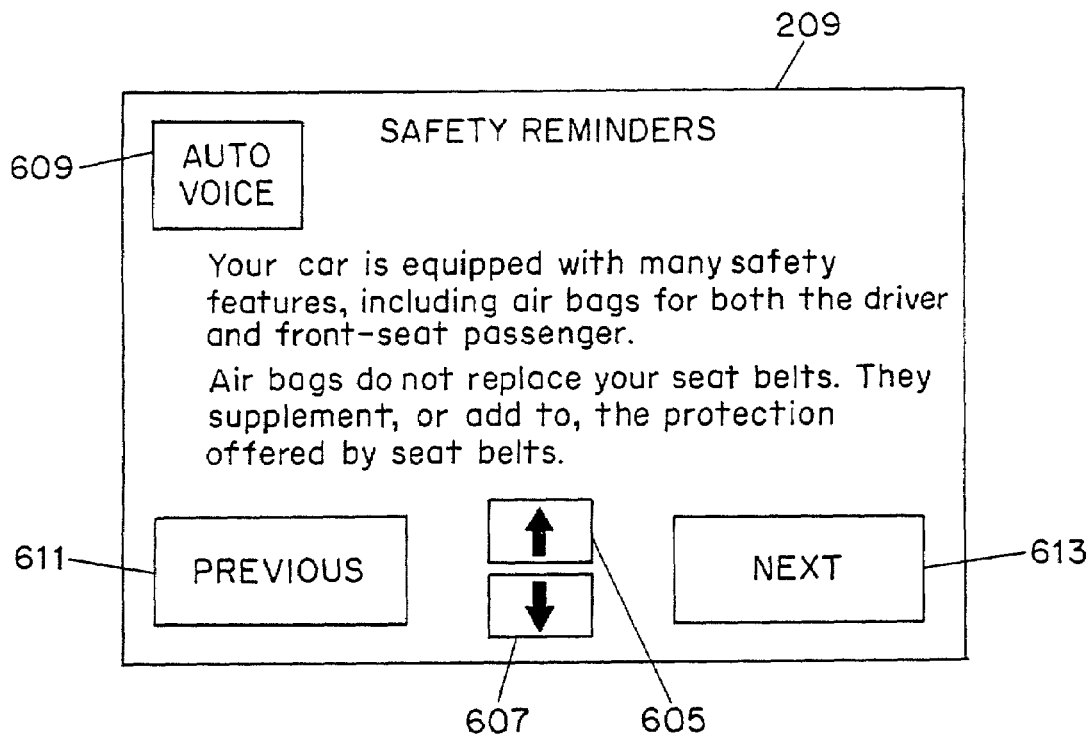
FIG. 10 illustrates a SAFETY REMINDERS screen including features thereof in accordance with the invention.

Other displayed options on the screen of FIG. 9 include PREVIOUS option 611 and NEXT option 613. As indicated at step 323, option 611 when selected causes routine 300 to return to step 314, where the introduction screen of FIG. 8 is again displayed. Otherwise, if option 613 is selected, routine 300 proceeds to step 326 in FIG. 5B where processor 105 causes a "SAFETY REMINDERS" screen to be displayed on screen 209. FIG. 10 illustrates such a screen.

Figure 11:
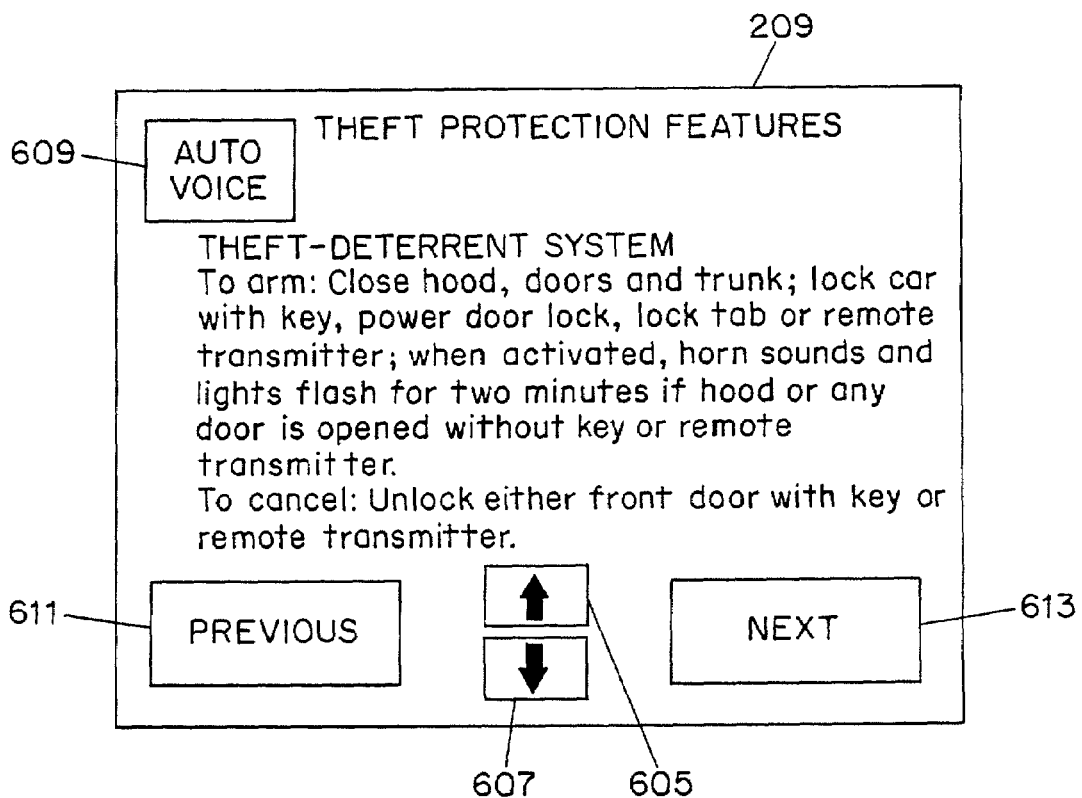
FIG. 11 illustrates a THEFT PROTECTION FEATURES screen including features thereof in accordance with the invention.

As shown in FIG. 10, like the MANUFACTURER screen, the SAFETY REMINDERS screen includes option 609 displayed with the default wording "AUTO VOICE" thereon, PREVIOUS option 611, NEXT option 613, scroll-up option 605 and scroll-down option 607. This screen reminds the user of the safety features of the vehicle including, for example, air bags and seat belts. As indicated at step 329, option 611 when selected causes routine 300 to return to step 320 of FIG. 5A. Otherwise if option 613 is selected, routine 300 proceeds to step 332 where processor 105 causes a "THEFT PROTECTION FEATURES" screen to be displayed on LCD screen 209. FIG. 11 illustrates such a screen.

Figure 12:
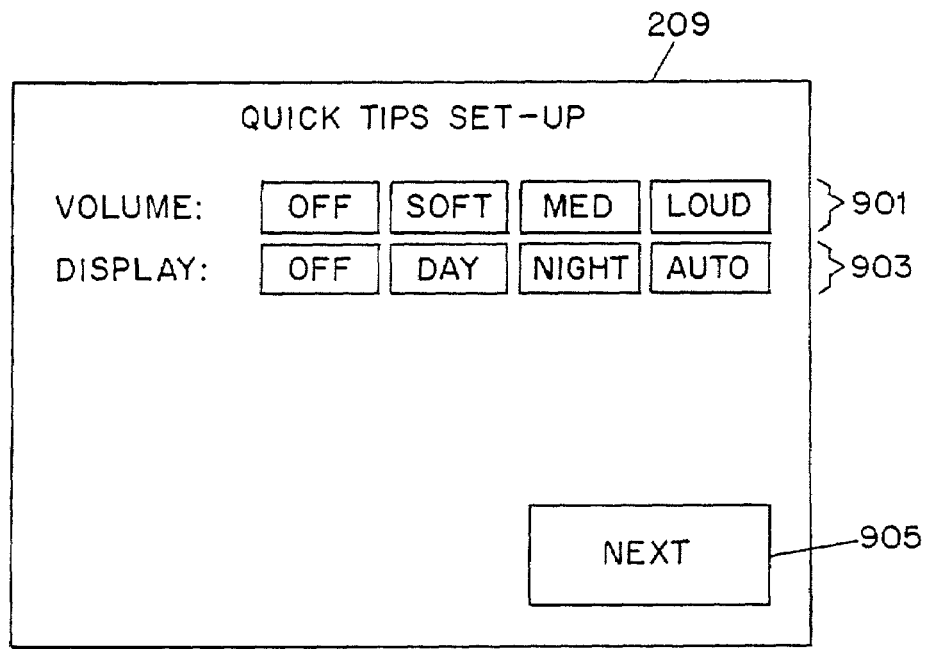
FIG. 12 illustrates a QUICK TIP SET-UP screen including features thereof in accordance with the invention.

As shown in FIG. 11, the THEFT PROTECTION FEATURES screen similarly has thereon displayed options 605, 607, 609, 611 and 613. This screen describes to the user a theft-deterrent system including the anti-theft routine of FIG. 3 equipped in the vehicle. As indicated at step 335, option 611 when selected causes routine 300 to return to step 326. Otherwise if option 613 is selected, routine 300 proceeds to step 338 where processor 105 causes a "QUICK TIPS SET-UP" screen to be displayed on LCD screen 209. FIG. 12 illustrates such a screen.

As shown in FIG. 12, the QUICK TIPS SET-UP screen comprises two arrays of displayed options, denoted 901 and 903, respectively. Array 901 concerns the volume of the audio part of system 100. In this illustrative embodiment, the user may select the options in array 901 to respectively turn the volume off, to a "SOFT" level, to a medium level, and to a "LOUD" level. Array 903 concerns the display of LCD 119 of system 100. In this illustrative embodiment, the user may select the options in array 903 to respectively turn the display off, adjust it to a "DAY" setting, adjust it to a "NIGHT" setting, and have it automatically adjusted. When the QUICK TIPS SETUP screen comes on, by default, the volume is set to a medium level (i.e., the "MED" option in array 901 highlighted blue), and the display is set to be automatically adjusted (i.e., the "AUTO" option in array 903 highlighted blue).

Also shown in FIG. 12 is NEXT option 905. By selecting this option, routine 300 returns to step 340 of FIG. 5A where a "MAIN MENU" screen is displayed on LCD screen 209. After routine 300 is performed, the screen of FIG. 12 can be invoked at any time by pressing SETUP switch 205g to re-adjust the volume and the intensity of the LCD of system 100.

Figure 13:
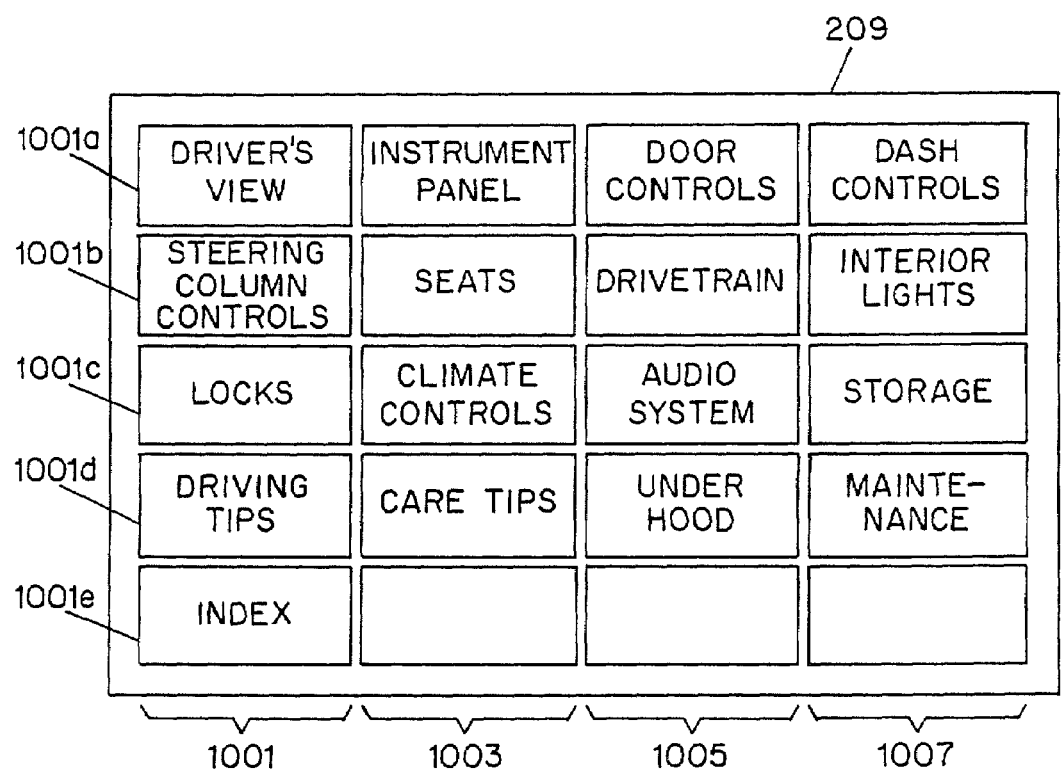
FIG. 13 illustrates a MAIN MENU screen including features thereof in accordance with invention.

FIG. 13 illustrates the MAIN MENU screen. This screen comprises displayed options disposed in columns 1001, 1003, 1005, and 1007. For example, column 1001 includes DRIVER'S VIEW option 1001a, STEERING COLUMN CONTROLS option 1001b, LOCK option 1001c, DRIVING TIPS option 1001d, and INDEX option 1001e. It should also be noted that this screen can be invoked at any time by pressing MENU switch 205e.

When the MAIN MENU screen comes on, by default, DRIVER'S VIEW option 1001a is highlighted yellow, indicating that it is selected. However, the user may touch any other displayed option on screen 209 for re-selection. A further touch on the yellow highlighted option changes its color to blue and activates same. Again, the user may alternatively maneuver PUSH TO SELECT knob 205*d* to re-select any other displayed option, followed by a depression of ENTER switch 205*b* to activate the selected option. Since LCD screen 209 is compact, the display area for each option on the MAIN MENU screen is generally small. As a result, selection and activation of an option by touching the option on the screen is susceptible to errors, especially when the vehicle is in motion. Thus, in this situation it may be preferable to achieve the same result using knob 205*d* and switch 205*b*, instead.

In addition, because of the small display area allocated to each option on the MAIN MENU screen, the wording on the option is brief and thus tends to be cryptic. In accordance with a feature of the invention, after a predetermined time (e.g., a few seconds) has elapsed from the option's being highlighted yellow, processor 105 causes a voice to be generated on speakers 127 to explain the purpose of the option before the user activates it. For example, after a predetermined delay from DRIVER'S VIEW option 1001*a*'s being highlighted yellow, a voice is activated, stating the option name, followed by an explanation of the purpose of the option such as "To provide location of dash mounted components." Thus, this inventive feature affords a preview of the option before the user commits to it, thereby avoiding unnecessary backtracking.

Figure 14:
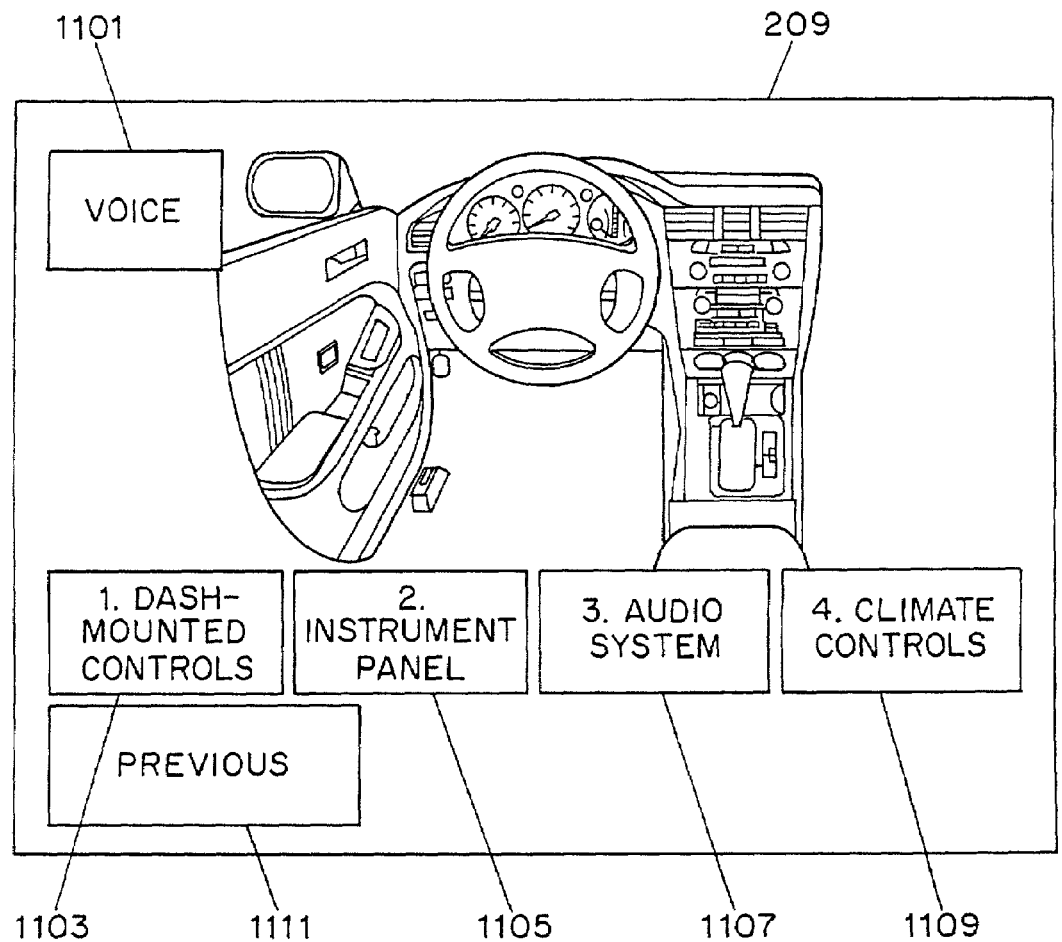
FIG. 14 illustrates a DRIVER'S VIEW screen including features thereof in accordance with the invention.

Continuing the example, after hearing the preview of option 1001*a*, the user decides to select that option. In response, processor 105 causes a "DRIVER'S VIEW" screen to be displayed on screen 209. Such a screen is illustrated in FIG. 14. When the DRIVER'S VIEW screen appears, VOICE option 1101 is highlighted blue, indicating that voice announcements are active. To disable the voice announcements, the user may touch VOICE option 1101 on screen 209, or alternatively press ENTER switch 205*b*. VOICE option 1101 would be highlighted yellow when disabled.

As also shown in FIG. 14, a view of the interior of the automobile from the driver's perspective is provided. Underneath that view, DASH-MOUNTED CONTROLS option 1103, INSTRUMENT PANEL option 1105, AUDIO SYSTEM option 1107, CLIMATE CONTROLS option 1109 and PREVIOUS option 1111 are displayed. By default, DASH-MOUNTED CONTROLS option is highlighted yellow. However, the user in this example decides to select INSTRUMENT PANEL option 1105, instead. By touching option 1105 on screen 209, the option is highlighted yellow. If VOICE option is not disabled, after a predetermined delay, an announcement such as "To provide information on gauges, meters and warning lights" comes on to preview the purpose or content of option 1105. Options 1103, 1107, and 1109 are similarly programmed. In this instance, selecting PREVIOUS option 1111 enables the user to return to the MAIN MENU screen of FIG. 13.

It should be noted at this point that if the user chooses to return to the MAIN MENU screen, DRIVER'S VIEW option 1001*a* previously activated on that screen is highlighted in another distinctive color, e.g., grey, indicating its previous activation status. Advantageously, when the user searches for particular information using the MAIN MENU screen, and the information is not found through certain options activated, these options are now highlighted grey. Knowing those options highlighted grey have been explored, which do not lead to the desired information, the user would not re-activate them by mistake, thereby performing the search effectively. For that matter, in this illustrative embodiment, each option previously activated is highlighted in the above distinctive color, i.e., grey in this instance, indicating its previous activation status.

Figure 15A:
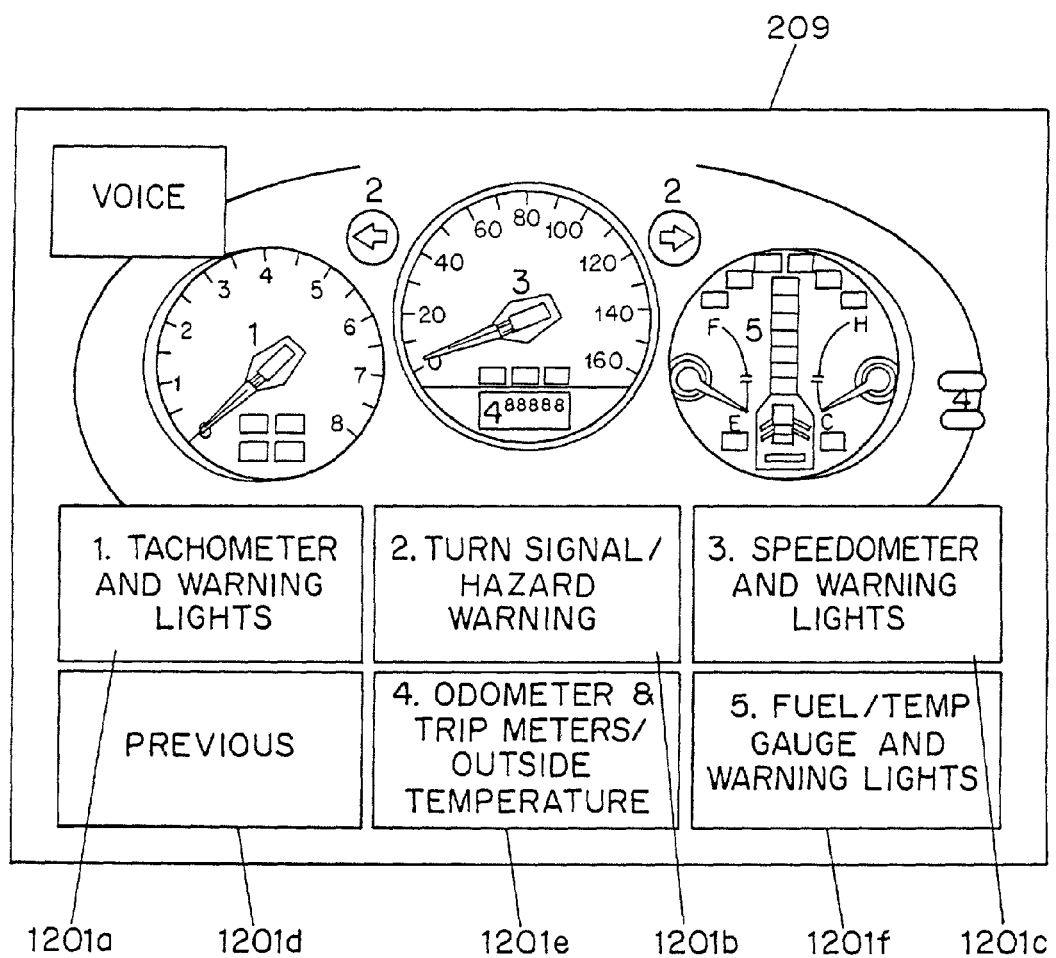
FIG. 15A illustrates an INSTRUMENT PANEL screen including features thereof in accordance with the invention.

Continuing the above example, assuming that the user activates option 1105 in FIG. 14 after hearing the aforementioned preview, in response processor 105 causes an a "INSTRUMENT PANEL" screen to be displayed on screen 209. Such a screen is illustrated in FIG. 15A. As shown in FIG. 15A, the previous screen format is generally maintained in that it provides a view of the object (the instrument panel of the automobile in this instance) pertinent to the option which has been selected, along with displayed options for further selection thereunder. Based on the disclosure heretofore, the design and operation of these screens by now are apparent to a person skilled in the art, and become self-explanatory.

In accordance with another feature of the invention, individual elements on the instrument panel shown in FIG. 15A are labeled with numerals "1", "2", "3", "4" and "5" which correspond to option 1201*a* designated "1. TACHOMETER AND WARNING LIGHTS", option 1201*b* designated "2. TURN SIGNAL/HAZARD WARNING", option 1201*c* designated "3. SPEEDOMETER AND WARNING LIGHTS", option 1201*e* designated "4. ODOMETER & TRIP METERS/OUTSIDE TEMPERATURE", and option 1201*f* designated "5. FUEL/TEMP GAUGE AND WARNING LIGHTS", respectively. As such, the function of the displayed options is two-fold. First, the wording on each displayed option informs the user of what the corresponding element(s) represents. Second, each displayed option is also for selection to obtain more information about the corresponding element(s). In addition, with the above voice preview feature, the user is further apprised of the purpose or content of the option before he/she commits to it. For example, TACHOMETER AND WARNING LIGHTS option 1201*a* corresponds to a voice preview such as "To provide information on tachometer and malfunction, maintenance required, low oil pressure and charging system failure indicators."

It should be noted at this point that in an alternative embodiment, the association of the displayed options with the corresponding elements on the instrument panel shown in FIG. 15A is not realized using numeral references, i.e., "1", "2", "3", "4" and "5" described above. Rather, in accordance with yet another aspect of the invention, as soon as one of the displayed options is selected (e.g., by touching the displayed option) on screen 209 and thus highlighted yellow in this instance, the corresponding element on the instrument panel is highlighted in the same color, thereby accomplishing the desired association without using any numeral references. Conversely, knowing a particular element on the instrument panel for which information is sought, the user selects (e.g., by touching) that particular element shown on the INSTRUMENT PANEL screen. Accordingly, the selected element on the screen is highlighted yellow, and at the same time the corresponding option is highlighted in the same color. The activation of the highlighted option may be achieved by, e.g., touching the highlighted option or the corresponding highlighted element on screen 209.

Figure 15B:
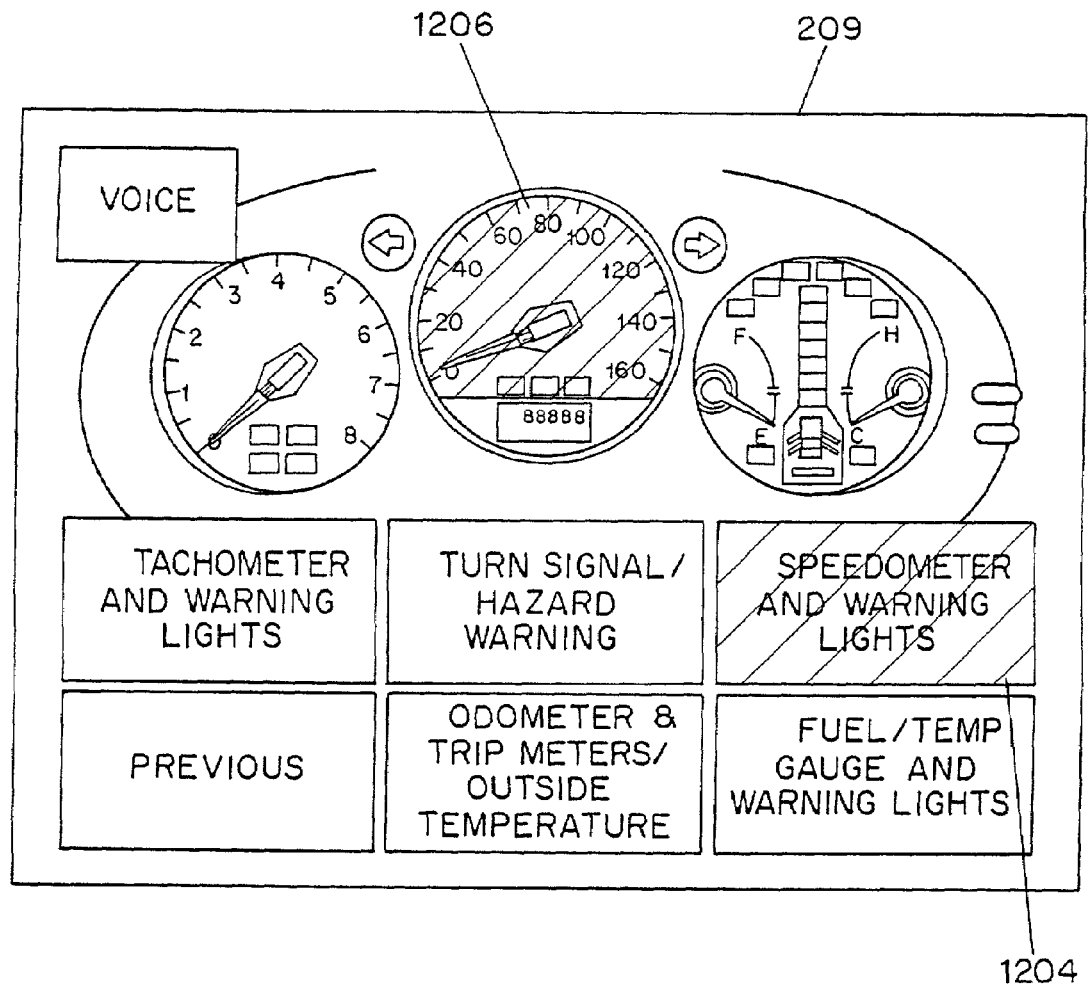
FIG. 15B illustrates an association of an item with an option corresponding thereto on a second INSTRUMENT PANEL screen in accordance with the invention.

FIG. 15B illustrates the INSTRUMENT PANEL screen in the alternative embodiment. For example, as soon as SPEEDOMETER AND WARNING LIGHTS option 1204 is selected and thus highlighted yellow (shown shaded), element 1206 depicting the corresponding speedometer and warning lights is also highlighted yellow (also shown shaded), and vice versa. In fact, the association using the same highlight in accordance with the invention applies throughout the screens, wherever appropriate, in the alternative embodiment, including the DRIVER'S VIEW screen described above.

Continuing the example in the present illustrative embodiment, assuming that the user in this instance activates option 1201*a* in FIG. 15A, in response processor 105 causes a "TACHOMETER AND WARNING LIGHTS" screen to be displayed on screen 209. Such a screen is illustrated in FIG. 16.

Figure 16:
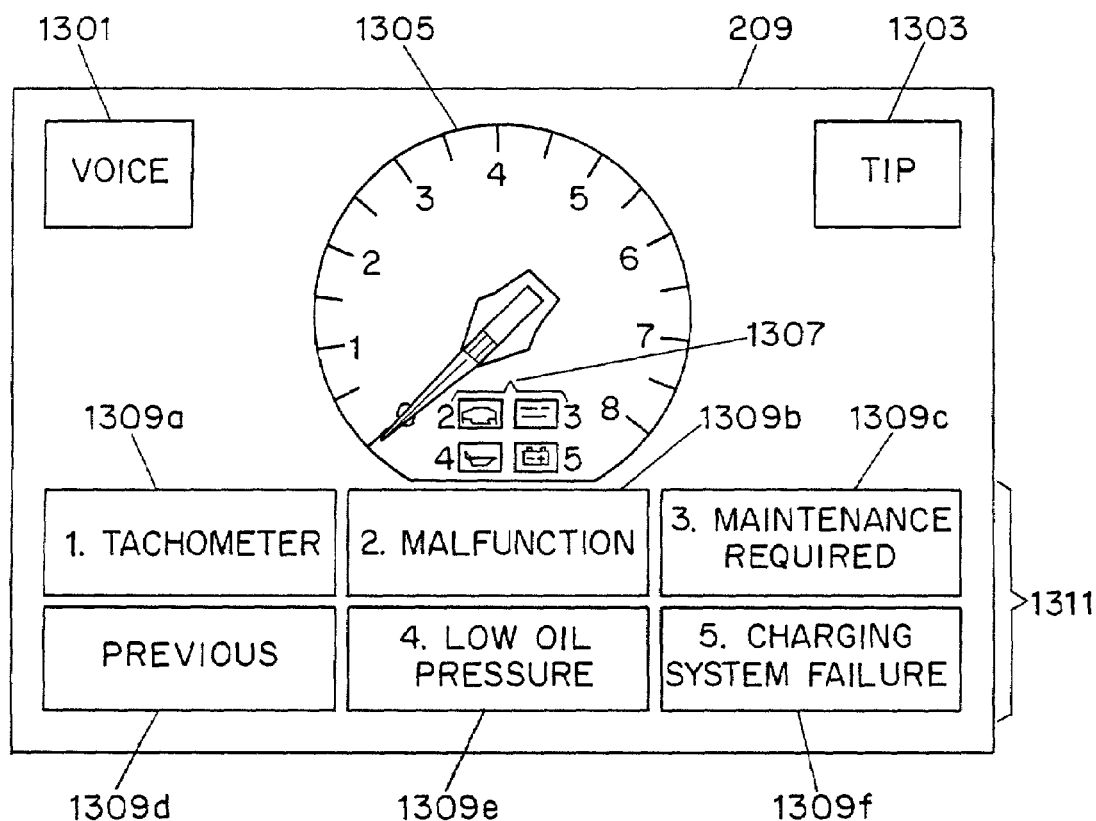
FIG. 16 illustrates a TACHOMETER AND WARNING LIGHTS screen including features thereof in accordance with the invention.

FIG. 16 shows VOICE option 1301 similar to option 1101 described before, TIP option 1303, a tachometer of the automobile denoted 1305, warning lights collectively denoted 1307, and options 1309*a* through 1309*f* in display segment 1311.

When TIP option 1303 appears on screen 209, it indicates that helpful hints or reminders are available upon selection thereof. In accordance with another feature of the invention, the appearance of TIP option 1303 is accompanied by the playing of a sound segment associated therewith. This sound segment may be pre-selected by the user from the SOUNDSGOOD library After an adaptation period, the user would be able to rely on the familiar sound segment, without looking at the screen, to alert him/her of the availability of the TIP option.

Similarly, the user may pre-select another sound segment associated with warnings. Such a sound segment should connote urgency or even emergency as such warnings include, for example, engine overheating, an extremely low fuel level caution, GPS emergency information from navigation interface 106*d*, etc. Under control of processor 115, audio interface 118 preempts any on-going announcement and momentarily substitute therefor any such warning as soon as it occurs, which is preceded by the associated sound segment. As mentioned before, such an emergency warning, along with the associated sound segment, is communicated to the user through central speaker 289 in FIG. 4, which is disposed directly across driver seat 295. As a result, the user is able to much appreciate the emergency of the warning due to both of the direction from which the warning is announced and the associated sound segment preceding it.

In any event, if option 1303 is selected in this instance, a voice comes on and utters a tip regarding tachometer 1305 such as "To prevent engine damage, do not drive with needle in red zone." This tip is also momentarily displayed on segment 1311 in lieu of options 1309*a* through 1309*f*.

Figure 17:
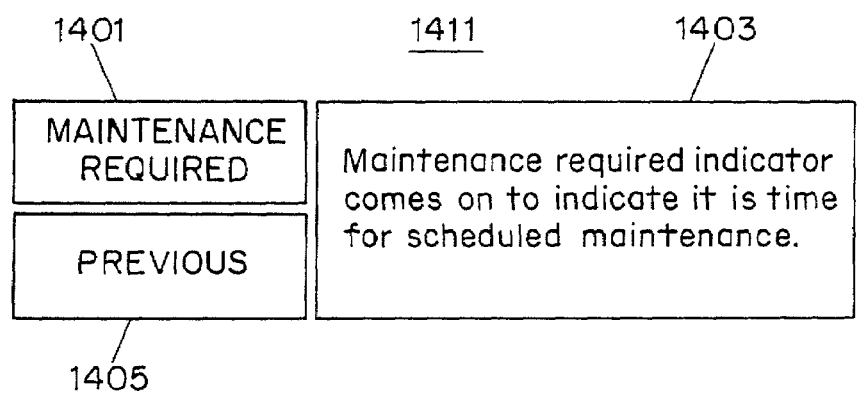
FIG. 17 illustrates a segment of the screen of FIG. 16 providing the user with information regarding a particular function of the automobile.

Similar to the elements on the INSTRUMENT PANEL screen, tachometer 1305 and warning lights 1307 on this screen are individually labeled and correspond to options 1309*a*, 1309*b*, 1309*c*, 1309*e* and 1309*f*, respectively. Assuming in this example that MAINTENANCE REQUIRED option 1309*c* is activated, display segment 1311 would be replaced by new display segment 1411 illustrated in FIG. 17. As shown in FIG. 17, item 1401 indicates the subject selected, i.e., "MAINTENANCE REQUIRED". Item 1403 explains what the MAINTENANCE REQUIRED warning light, when on, indicates. In this instance it states, "Maintenance required warning light comes on to indicate it is time for scheduled maintenance." PREVIOUS option 1405 enables the user to reactivate segment 1311 of FIG. 16.

Assuming further that at this point the user wants to learn about and also to program the air conditioning of the automobile, the user may access a "CLIMATE CONTROL" screen by successively pressing the PREVIOUS option to backtrack to the DRIVER'S VIEW screen of FIG. 14, where CLIMATE CONTROLS option 1109 is available. As a second alternative, the user may press MENU switch 205*e* to invoke the MAIN MENU screen of FIG. 13, where a "CLIMATE CONTROLS" option within column 1003 is available. A third alternative is provided in the event that the user cannot immediately relate "air conditioning" to the CLIMATE CONTROLS option. At the MAIN MENU screen of FIG. 13, the user may select Index option 1001*e* to be described. It suffices to know for now that this option allows the user to access the "CLIMATE CONTROL" screen using the term "air conditioning".

Figure 18:
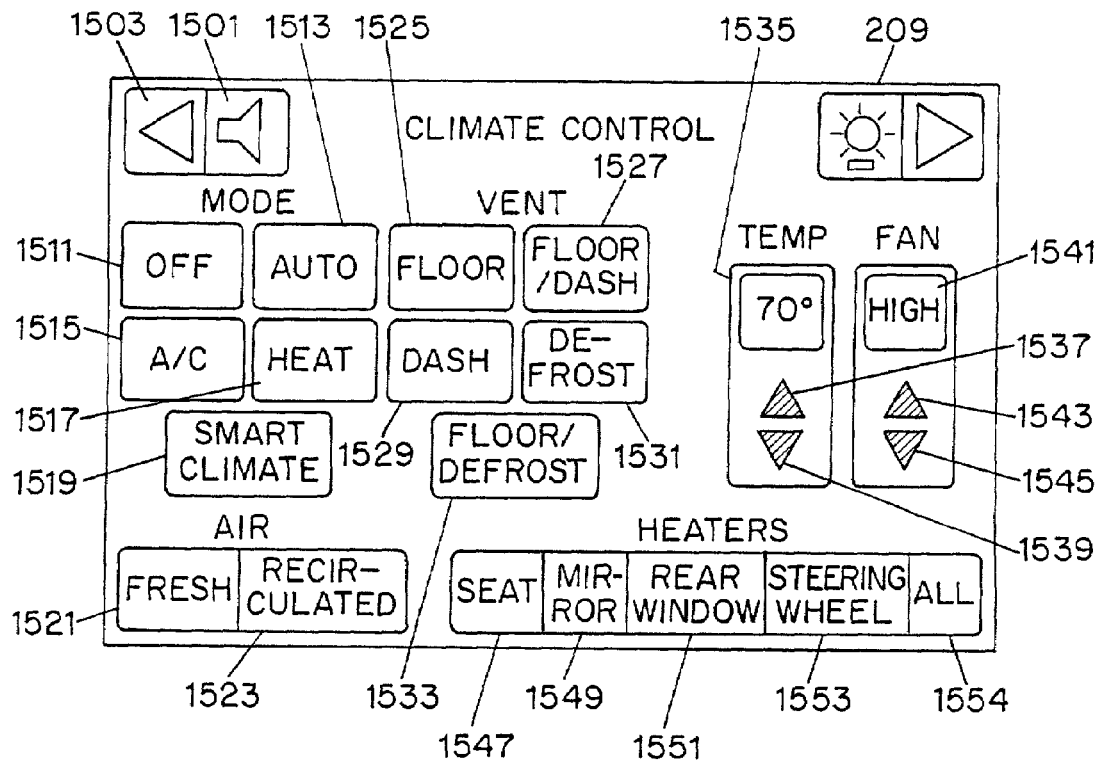
FIG. 18 illustrates a CLIMATE CONTROL screen including features thereof in accordance with the invention.

FIG. 18 illustrates the "CLIMATE CONTROL" screen. As shown in FIG. 18, VOICE option 1501 whose function is similar to that of option 1101 or 1301 described before is indicated in this instance using a pre-selected icon, as opposed to the word "VOICE". With the voice enabled, a first touch on any displayed option on screen 209 causes it to be highlighted yellow, indicating its selected status. A second touch causes it to be highlighted blue, indicating its active status. With the voice disabled, only one touch on any displayed option activates it.

Likewise, PREVIOUS option 1503 whose function is similar to that of option 1111 or 1309*d* described before is indicated in this instance using a second pre-selected icon, as opposed to the word "PREVIOUS". Advantageously, relying on icons instead of text describing the options, the user is able to select a desired option efficiently, especially when he/she is not proficient in a particular language (e.g., English in this instance) used in system 100. It will be appreciated that system 100, however, may provide different language versions of presentation, from which a user may select a desired language version.

The MODE options in FIG. 18 include OFF option 1511, AUTO option 1513, A/C option 1515, HEAT option 1517, and SMART CLIMATE option 1519. It should be noted that only one of the MODE options can be active at a time. In this example, assuming that the voice is enabled, when OFF option 1151 is selected by a first touch, a voice explaining the option comes on, uttering "To disable climate control." A second touch on the same option would then shut the climate control off through climate control interface 108*f*.

When AUTO option 1153 is selected by a first touch, a voice comes on to explain the option, uttering "System automatically determines air-flow distribution and volume for optimum efficiency." A second touch on the same option enables the automatic control, followed by a voice utterance, "Set desired temperature." Temperature display 1535 then flashes with the current temperature setting, prompting the user to set a desired temperature in a manner to be described.

If the user neglects to set a temperature after a predetermined time, in accordance with another aspect of the invention, a temperature range is automatically maintained by processor 105 in response to the date and time information from clock interface 108*j*, and the GPS information from navigation interface 106*d*. Based on the date and time information, processor 105 knows what the current season (e.g., mid-winter versus mid-summer) and time of the day (e.g., night verse noon) are. Based on the GPS information, processor 105 knows the region (e.g, New England versus Southern California) where the vehicle is. Processor 105 looks up a table stored in memory 115 containing predetermined temperature ranges corresponding to different combinations of the temporal and geographic parameters. It then prescribes an appropriate temperature range according to the table. This temperature range is updated by processor 105 periodically to reflect changes in the time of the day and the geographic location of the vehicle.

It should be noted that the actual realization of the temperature range as prescribed may depend on specific situations. For example, where the current temperature inside the vehicle is below the prescribed temperature range and sunlight is detected inside same, to conserve energy, processor 105 causes heaters in the vehicle to heat the vehicle compartment at a low rate, taking into account the sunlight shining through the windows of the vehicle, which helps heat the compartment due to the well known "greenhouse" effect. To that end, conventional devices sensitive to solar energy may be used to detect the presence and intensity of the sunlight inside the vehicle. Depending on the detected intensity, processor 105 accordingly adjusts the heating rates of the heaters to efficiently achieve the prescribed temperature range. In general, the higher the intensity, the lower are the heating rates.

Similarly, A/C option 1515 and HEAT option 1517 respectively enable the user to activate air conditioning and heaters at a desired temperature or a default temperature range.

SMART CLIMATE option 1519 is designed to allow the user to program the climate control for the next ride before he/she leaves the vehicle. When SMART CLIMATE option 1519 is selected by a first touch, a voice comes on to explain the option, uttering "To enable pre-heating or pre-cooling of vehicle." A second touch on the option activates the function, followed by a voice utterance, "Set desired temperature. Set desired time using fan speed arrows." Temperature display 1535 then flashes the current temperature setting, prompting the user to set a desired temperature. Similarly, fan speed display 1541 then flashes the current date, followed by current time, prompting the user to set the date and time that the user plans to re-enter the vehicle. Through climate control interface 108f, processor 105 determines whether the current level of power from the car battery and any back-up power sources is sufficient. If it is insufficient, a message such as "Fail to pre-condition vehicle temperature" is issued through audio interface 118 to notify the user of the noncompliance. Otherwise, when it is close to the re-entry time, processor 105 determines the start-up time to effect the pre-conditioning, depending on the temperature difference between the inside and outside of the vehicle at that time. Processor 105 would then cause a combination of heaters and/or heat pumps (not shown) connected to interface 108f to pre-condition the vehicle temperature. In order to avoid substantially draining the power, in this illustrative embodiment, the requested temperature would be maintained up to an hour after the set re-entry time.

The Air options in FIG. 18 include FRESH option 1521 and RECIRCULATED option 1523. Only one of these two options can be active at a time. When FRESH option 1521 is selected by a first touch on the option, a voice comes on to explain the selected option, uttering "To select outside air to circulate in vehicle." A second touch on the option activates the selection to ventilate the vehicle with outside air. Similarly, RECIRCULATED option 1523 allows the user to select the inside air for recirculation in the vehicle.

The VENT options in FIG. 18 include FLOOR option 1525, FLOOR/DASH option 1527, DASH option 1529, DEFROST option 1531 and FLOOR/DEFROST option 1533. Only one of these five options can be active at a time. When FLOOR option 1525 is selected by a first touch on the option, a voice comes on explaining the option, uttering "Main air distribution to floor." A second touch on the option directs an air flow toward the vehicle floor.

Similarly, FLOOR/DASH option 1527 enables the user to bifurcate the air flow between the floor and the dashboard. DASH option 1529 enables the user to direct the air flow from the dashboard. DEFROST option 1531 enables the user to direct the air flow toward the windshield and select fresh air if not selected. FLOOR/DEFROST option 1533 enables the user to bifurcate the air flow between the floor and windshield.

Temperature display 1535 displays the temperature selected by the user Touching on up-arrow 1537 increases the selected temperature while touching on down-arrow 1539 decreases same. Continued touching on either up-arrow 1537 or down-arrow 1539 causes the temperature setting to change rapidly.

Similarly, fan speed display 1541 displays the fan speed (high, medium or low) selected by the user. Touching on up-arrow 1543 increases the selected fan speed while touching down-arrow 1539 decreases same.

The HEATERS options in FIG. 18 include SEAT option 1547, MIRROR option 1549, REAR WINDOW option 1551, STEERING WHEEL option 1553, and ALL option 1554. One or more of these options can be active at the same time. When SEAT option 1547 is selected by a first touch on the option, a voice comes on to explain the option, uttering "To enable seat heaters." A second touch on the option activates the seat heaters connected to climate control interface 108f.

Similarly, MIRROR option 1549 enables the user to activate outside mirror heaters. REAR WINDOW option 1551 enables the user to activate a rear window defroster. STEERING WHEEL option 1553 enables the user to activate a steering wheel heater. Finally, ALL option 1554 enables the user to activate all of the heaters simultaneously.

Figure 19:
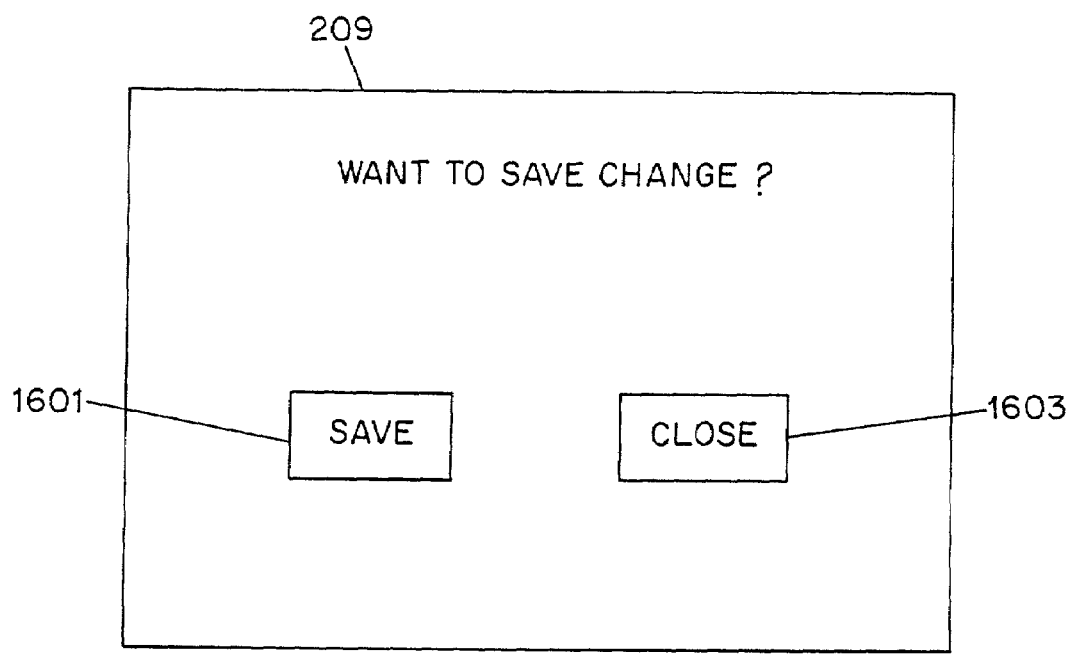
FIG. 19 illustrates a SAVE screen for saving the user's preferences in accordance with the invention.

In personalizing the vehicle, preference interface 116 monitors any user adjustments to certain vehicle functions by comparing their current settings with the corresponding stored preferences in memory 115. Thus, for example, if the user changes any of the settings relating to the climate control such as the mode, vent, air, temperature, fan speed, etc. from its previous preferred setting, preference interface 116 causes a SAVE screen to appear on screen 209. This SAVE screen is illustrated in FIG. 19. As shown in FIG. 19, the user is prompted to save the change in the setting that he/she has just made. The user at this point may activate SAVE option 1601 to change the previous preferred setting. The SAVE screen thereafter disappears in favor of the previous screen. Otherwise, he/she may activate CLOSE option 1603 to close the SAVE screen, without storing the latest setting, which is then treated as a temporary setting. In the latter case, for example, a restart of the automobile will obliterate such a temporary setting, and reinstate the stored preferred setting.

Climate control screens can similarly be invoked by the front passenger and rear passengers on display interfaces 102c and 102d, respectively. Such screens provide similar MODE options including OFF, AUTO, A/C and HEAT options; and VENT options including LOWER VENT, UPPER VENT and LOWER/UPPER vent options. They also provide for temperature and fan speed adjustments for the respective localized areas. However, no save screen is provided.

Figure 20:
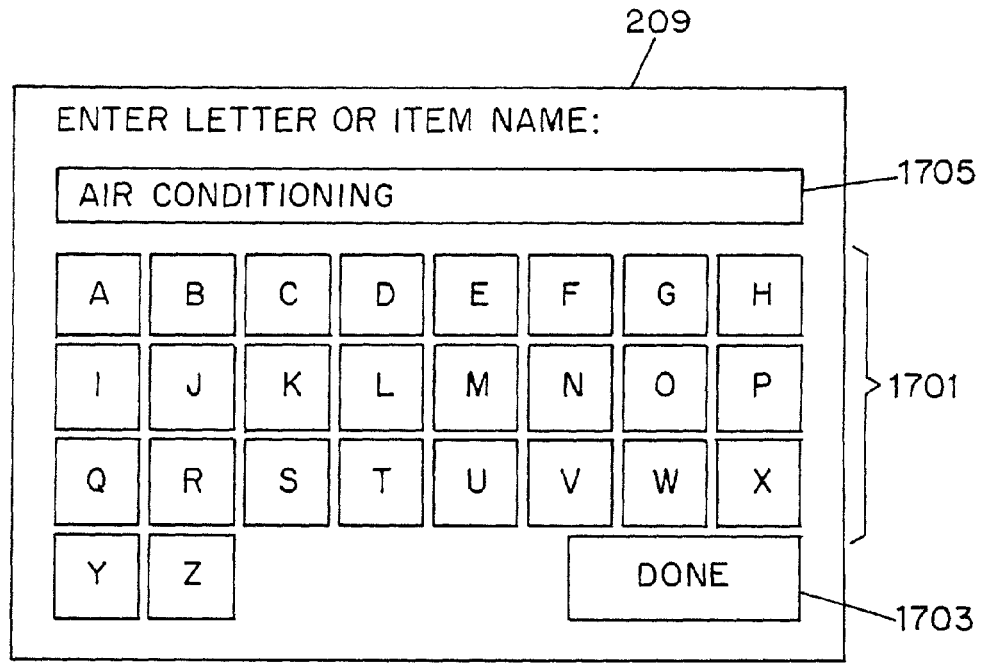
FIG. 20 illustrates a DATA ENTRY screen in accordance with the invention for looking up information regarding a specific item in the automobile.

Using INDEX option 1001e of FIG. 13 to look up information on and/or to control various items in the automobile will now be described. After option 1001e is activated, a DATA ENTRY screen illustrated in FIG. 20 is exhibited on screen 209. As shown in FIG. 20, a message "Enter Letter Or Item Name" appears to prompt the user for an entry of the name of the item of interest or its beginning letter. For this purpose, entry options for letters A through Z arranged in a grid format are provided in section 1701 for selection. In addition, DONE option 1703, when activated, indicates to system 100 that the entry is completed. Subdisplay 1705 is used to echo the user's entry to ensure its correctness.

Figure 21:
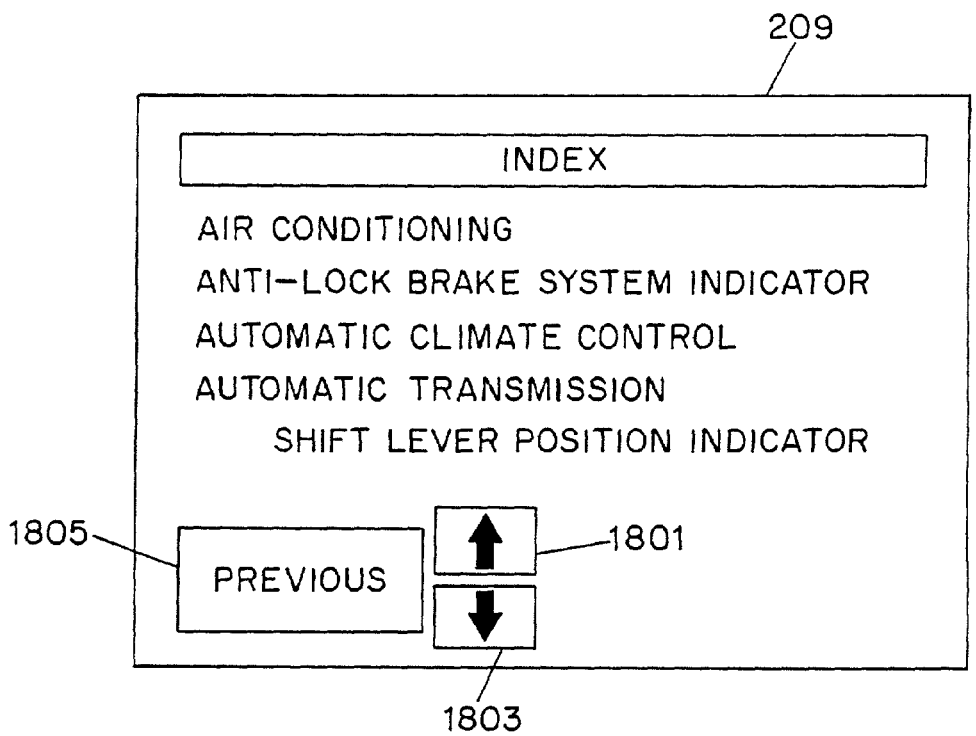
FIG. 21 illustrates an INDEX screen with listed items for which information is available.

In this illustration, the user enters "AIR CONDITIONING" as exhibited on subdisplay 1705. In response, an INDEX screen shown in FIG. 21 appears on display screen 209, with the search item name "AIR CONDITIONING" highlighted yellow. It should be noted that other item names such as "Anti-lock Brake System Indicator" are also shown, and they are in alphabetical order following "AIR CONDITIONING". This stems from the design of system 100 whereby the user may conveniently enter the beginning letter of the search item name only. In that case, a list of item names in alphabetical order with the first item name having the same beginning letter highlighted yellow. For instance, if the user had only entered "A" for "AIR CONDITIONING", a list of item names starting with "A" in alphabetical order would appear on screen 209 (although in this instance it would be the same list as shown in FIG. 21 as "AIR CONDITIONING" is the first item with a letter "A" in system 100). If the user cannot locate the name of the item of interest in the list, he/she may scroll the screen using scroll-up option 1801 or scroll-down option 1803 to review additional item names after or before the listed item names. Alternatively, the user may select PREVIOUS option 1805 to return to the screen of FIG. 20 to enter the complete item name.

In any event, after the user locates the item name on the INDEX screen, the user may then touch the item name to access information on that item. To that end, a look-up table is stored in memory 115. FIG. 22 illustrates such a look-up table, wherein left column 1901 lists each item name in alphabetical order in the index, and right column 1903 lists the corresponding instruction for processor 105 to carry out to access information on that item. For example, according to row 1905 of the table, the selection and activation of the item name "AIR CONDITIONING" causes processor 105 to connect the user to the CLIMATE CONTROL screen of FIG. 18 previously described.

The foregoing merely illustrates the principles of the invention. It will thus be appreciated that those skilled in the art will be able to devise numerous other systems which embody the principles of the invention and are thus within its spirit and scope.

For example, based on the disclosure heretofore, it is apparent that through system 100, the user can run diagnostics on selected parts of the automobile by voice command or touch-screen control.

In addition, it will be appreciated that a windows based operating system of the type of the MICROSOFT WINDOWS operating system is installed on system 100. Specifically, a copy of the operating system software is stored in memory 115. Utilizing such an operating system, processor 105 can be programmed to control display interfaces 102 to present information through one or more windows on screen 209. Thus, in that case, the user may activate two or more options from the MAIN MENU screen of FIG. 13, e.g., the INSTRUMENT PANEL option and CLIMATE CONTROLS option, one after another. Accordingly, in a well-known manner, processor 105 causes the corresponding screens, e.g., the INSTRUMENT PANEL screen of FIG. 15A and the CLIMATE CONTROL screen of FIG. 18, to be displayed in respective windows on screen 209. Advantageously, with the multiple windows, the user may efficiently control and retrieve information from the multiple displayed screens.

Moreover, with the above operating system, processor 105 is responsive to signals generated by an indicator device used to point at and click on a displayed option to select and activate same. For example, such an indicator device may be a mouse, joystick, stylus, trackball or touchpad which may be operable by hand or foot, and wired or wireless.

Further, in the disclosed embodiment, through system 100, the user is able to program the climate control for the next ride before he/she leaves the vehicle. It will be appreciated that the user will be able to achieve same remotely ahead of time via telecommunication means. For example, processor 105 may be programmed to accept climate control commands through phone interface 106a. In that instance, the user can call from anywhere to establish a phone connection with phone interface 106a using a predetermined phone number, through which the user communicates the commands to climate control interface 108f to program the climate control. Through the phone connection, the user may be provided with climate control options described above in a synthesized voice. The user may activate one or more of such options by pressing a predetermined touch-tone key on the telephone keypad corresponding to a "yes" or "no" response. Similarly, the user may achieve the relevant temperature and/or time settings by pressing the touch-tone keys corresponding to the numerals indicative thereof. Of course, telecommunication means other than the telephone including a radio frequency (RF) transmitter may also be used to communicate the climate control commands from a remote area.

In addition, in the disclosed embodiment, the user may access different screens provided by AUTO DIRECTOR display interface 102a to learn about and control certain vehicle functions. It will be appreciated that a person skilled in the art will develop a demonstration program wherein a series of such screens will be automatically presented to a user in a predetermined sequence. The presentation may include commentaries, and highlights on selected options displayed on each screen. Furthermore, the presentation may be coupled with the showing of actual vehicle functions. For example, in demonstrating the climate control screen of FIG. 18, while the function of a highlighted VENT option (e.g., Floor, Floor/Dash, Dash, Defrost or Floor/Defrost) is explained, it is activated so that the user in the automobile can feel an actual air flow from the corresponding direction. The above demonstration program may be invoked using a PIN provided by the automobile manufacturer. The program may run continually while the automobile is shown in a showroom, or may be invoked by the user occasionally to obtain relevant information.

Further, in the disclosed embodiment, the MAINTENANCE REQUIRED warning light comes on when it is time for scheduled maintenance. In accordance with another aspect of the invention, the maintenance is scheduled by system 100 according to the cumulative time of the tachometer reading above a predetermined RPM value. Such cumulative time reflects the extent of the engine wear, and if it exceeds a predetermined length of time without maintenance, the engine performance would degrade substantially. In measuring the cumulative time in question, a conventional comparator (not shown) is employed in system 100 to compare the instantaneous tachometer reading (provided by engine control interface 112c) with the predetermined RPM value. Each time when the tachometer reading exceeds the predetermined value, processor 105 is interrupted to register the length of such an occurrence. The latter is added to a running sum to update the cumulative time in question. This cumulative time may be displayed on instrument panel display interface 102e, along with the tachometer reading and the MAINTENANCE REQUIRED warning indicator. A second conventional comparator (not shown) is employed in system 100 to compare the cumulative time with the above predetermined time length. As soon as the cumulative time exceeds the predetermined length, processor 105 is interrupted and causes the MAINTENANCE REQUIRED warning light to come on, indicating that it is time for maintenance.

Still further, system 100 as described is highly adaptable in adjusting to new system requirements, and capable of "learning" new automobile features to be introduced into the system. Such learning may involve a modification or an upgrade in the system software stored in memory 115.

Moreover, other features of system 100 may include capabilities of communications with a third party remote from the vehicle. For example, system 100 may be programmed to transmit signals representing data on the current speed of the vehicle and its VIN receivable by a radar system, thus enabling the third party to monitor its speed. Furthermore, system 100 may be programmed by the third party to disable and subsequently enable the vehicle upon successful verification of a PIN pre-assigned to the third party. To that end, system 100 is capable of receiving remote transmission of the PIN, followed by the disable or enable code. The transmission may be encrypted for security reasons. Furthermore, more than one PIN may be used for different purposes. For example, a PIN may be assigned to a law enforcement agency to disable the vehicle because of a suspension of a license, or to temporarily disable the vehicle when the driver is intoxicated. Another PIN may be assigned to an environmental protection agency to disable the vehicle for failing to meet the emission requirements. Yet another PIN may be assigned to the vehicle owner to disable the vehicle when parked, thereby reducing the risk of a car theft. The disabling of the vehicle involves cutting off its gas, putting on its anti-lock brakes, etc.

Further, system 100 is capable of receiving a low-frequency, low-power broadcast covering an area of a limited radius, referred to as a "Cell". The broadcast may provide electronic GPS map and Yellow Page type information pertaining to the cell. This information, when received, may be downloaded onto AUTO DIRECTOR display interface 102a or multifunction display interface 102b. Such information includes a local directory indicating locations of nearby gas stations, restaurants and other facilities on the GPS map, with respect to the current location of the automobile. The local directory may be formatted in the form of "web pages" featuring the local businesses, and include additional information such as business hours, telephone numbers, and information on products and services provided by such businesses.

The above broadcast may also provide local weather information sponsored by a civic group or commercial entity. In the case of civic group sponsorship, the local civic events may be posted alongside the weather information, and in the case of commercial sponsorship, advertisements may be posted instead. Of course, as the automobile moves from cell to cell, the contents of the broadcast change accordingly.

In addition, while the radio in the automobile is tuned to a particular radio station, system 100 is also capable of receiving any electronic files broadcast from that radio station, along with the radio program. These electronic files, which may be in the form of web pages, can be downloaded onto the system. The system user may then scroll the pages to learn such information as program listings and coming events sponsored by the radio station.

Moreover, in the disclosed embodiment, system 100 is illustratively used in an automobile. It will be appreciated that a person skilled in the art may also employ the inventive system in another type of vehicle such as a boat, an airplane, etc.

Finally, although information and control system 100, as disclosed, is embodied in the form of various discrete functional blocks, the system could equally well be embodied in an arrangement in which the functions of any one or more of those blocks or indeed, all of the functions thereof, are realized, for example, by one or more appropriately programmed processors or devices.

The invention claimed is:

1. A method for assisting a user of a vehicle comprising:
   determining whether the vehicle needs a maintenance service;
   obtaining data concerning locations of at least first and second service providers for providing the maintenance service when it is determined that the vehicle needs the maintenance service;
   obtaining data concerning a current location of the vehicle;
   determining, of the at least first and second service providers, a closer service provider to the current location of the vehicle based on the data concerning the current location of the vehicle and the data concerning the locations of the at least first and second service providers; and
   selecting the closer service provider to provide the maintenance service when the closer service provider is within a predetermined distance from the current location of the vehicle.

2. The method of claim 1 further comprising communicating to the user information about the selected service provider when the selected service provider is within the predetermined distance from the current location of the vehicle.

3. The method of claim 2 wherein the information is communicated via audio media.

4. The method of claim 2 wherein the information is communicated visually.

5. The method of claim 1 wherein data concerning a location of the selected service provider is supplied to a navigator for providing directions to reach the location of the selected service provider.

6. The method of claim 1 wherein the data concerning the locations of the at least first and second service providers includes GPS data.

7. The method of claim 1 wherein the data concerning the current location of the vehicle includes GPS data.

8. The method of claim 1 wherein the selected service provider includes a service station.

9. A method for use in a system in a vehicle comprising:
   storing data concerning locations of a plurality of service providers; determining whether the vehicle needs a maintenance service; retrieving at least part of the data in response to a determination that the vehicle needs the maintenance service;
   comparing data concerning a current location of the vehicle with the retrieved data to identify one of the plurality of service providers which is closest to the current location of the vehicle and provides the maintenance service; and
   selecting the identified service provider to provide the maintenance service when the identified service provider is within a predetermined distance from the current location of the vehicle.

10. The method of claim 9 further comprising communicating information about the selected service provider when the selected service provider is within the predetermined distance from the current location of the vehicle.

11. The method of claim 10 wherein the information is communicated via audio media.

12. The method of claim 10 wherein the information is communicated visually.

13. The method of claim 9 wherein data concerning a location of the selected service provider is supplied to a navigator for providing directions to reach the location of the selected service provider.

14. The method of claim 9 wherein the retrieved data includes GPS data.

15. The method of claim 9 wherein the data concerning the current location of the vehicle includes GPS data.

16. A system for use in a vehicle comprising:
a memory for storing data concerning locations of a plurality of service providers;
a mechanism for determining whether the vehicle needs a maintenance service, at least part of the data being retrieved from the memory in response to a determination that the vehicle needs the maintenance service; and
a processor for comparing data concerning a current location of the vehicle with the retrieved data to identify one of the plurality of service providers which is closest to the current location of the vehicle and provides the maintenance service, the identified service provider being selected to provide the maintenance service when the identified service provider is within a predetermined distance from the current location of the vehicle.

17. The system of claim 16 further comprising an interface for communicating information about the selected service provider when the selected service provider is within the predetermined distance from the current location of the vehicle.

18. The system of claim 17 wherein the information is communicated via audio media.

19. The system of claim 17 wherein the interface includes a display element, and the information is displayed on the display element.

20. The system of claim 16 wherein data concerning a location of the selected service provider is supplied to a navigator for providing directions to reach the location of the selected service provider.

21. The system of claim 16 wherein the retrieved data includes GPS data.

22. The system of claim 16 wherein the data concerning the current location of the vehicle includes GPS data.

23. The system of claim 16 wherein the selected service provider includes a service station.

* * * * *